US012658395B2

(12) United States Patent
Fitzgerald et al.

(10) Patent No.: US 12,658,395 B2
(45) Date of Patent: Jun. 16, 2026

(54) MEMS SWITCH FOR RF APPLICATIONS

(71) Applicant: Analog Devices International Unlimited Company, Limerick (IE)

(72) Inventors: Padraig Fitzgerald, Mallow (IE); Philip James Brennan, Bandon (IE); Jiawen Bai, Brighton, MA (US); Michael James Twohig, County Cork (IE); Bernard Patrick Stenson, Upper Manister (IE); Raymond C. Goggin, Watergrasshill (IE); Mark Schirmer, Sunapee, NH (US); Paul Lambkin, Kilmoney (IE); Donal P. McAuliffe, Limerick (IE); David Aherne, Limerick (IE); Cillian Burke, Limerick (IE); James Lee Lampen, Douglas, MA (US); Sumit Majumder, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 214 days.

(21) Appl. No.: 18/512,886

(22) Filed: Nov. 17, 2023

(65) Prior Publication Data

US 2024/0087828 A1 Mar. 14, 2024

Related U.S. Application Data

(63) Continuation of application No. PCT/US2022/029593, filed on May 17, 2022.

(Continued)

(51) Int. Cl.
*H01H 59/00* (2006.01)

(52) U.S. Cl.
CPC . *H01H 59/0009* (2013.01); *H01H 2059/0054* (2013.01)

(58) Field of Classification Search
CPC ... B81C 1/00; B81C 1/00015; B81C 1/00134; B81C 1/0015; B81C 1/00174;
(Continued)

(56) References Cited

U.S. PATENT DOCUMENTS 3,671,868 A * 6/1972 Sanders ................ H03D 11/00
455/325
5,880,921 A 3/1999 Tham et al.
(Continued)

FOREIGN PATENT DOCUMENTS

CN 101118819 A 2/2008
CN 101402100 A 4/2009
(Continued)

OTHER PUBLICATIONS

"German Application Serial No. 112022002712.6, Office Action mailed Apr. 25, 2025", w/ English machine translation, 9 pgs.
(Continued)

*Primary Examiner* — Anthony R Jimenez
(74) *Attorney, Agent, or Firm* — Schwegman Lundberg & Woessner, P.A.

(57) ABSTRACT

Microelectromechanical systems (MEMS) switches are disclosed. Parallel configurations of back-to-back MEMS switches are disclosed in some embodiments. An isolation connection of constant electrical potential may be made to a midpoint of the back-to-back switches. In some embodiments, a separate MEMS switch is provided as a shunt switch for the main MEMS switch. MEMS switch device configurations having multiple switchable signal paths each coupling a common input electrode to a respective output electrode are also disclosed. The MEMS switch device includes shunt switches each coupling a respective output electrode to a reference potential. The presence of a shunt switch coupled to an output electrode enhances the isolation (Continued)

of the signal path corresponding to that output electrode when the path is open.

20 Claims, 20 Drawing Sheets

Related U.S. Application Data

(60) Provisional application No. 63/190,227, filed on May 18, 2021.

(58) Field of Classification Search
CPC ... B81C 2201/00; B81C 2201/01; B81B 7/00; B81B 2207/00; B81B 2207/012; B81B 2207/015; B81B 2207/05; B81B 3/00; B81B 3/0002; B81B 3/0013; B81B 3/0016; B81B 3/0032; B81B 3/0054; B81B 3/08; B81B 3/0064; H01H 59/00; H01H 59/0009; H01H 2059/00; H01H 2059/0054
USPC .......................................................... 200/181
See application file for complete search history.

(56) References Cited

U.S. PATENT DOCUMENTS

| | | | |
|---|---|---|---|
| 6,229,683 | B1 | 5/2001 | Halden et al. |
| 6,388,631 | B1 | 5/2002 | Livingston et al. |
| 6,531,668 | B1 | 3/2003 | Ma |
| 6,686,820 | B1 | 2/2004 | Ma et al. |
| 6,879,429 | B2 | 4/2005 | Wong et al. |
| 6,940,363 | B2 | 9/2005 | Zipper et al. |
| 6,972,881 | B1 | 12/2005 | Chester |
| 7,102,472 | B1 | 9/2006 | Nathanson et al. |
| 7,119,943 | B2 | 10/2006 | Nelson et al. |
| 7,808,764 | B2 | 10/2010 | O'Brien et al. |
| 7,821,466 | B2 | 10/2010 | Lempkowski |
| 7,839,611 | B2 | 11/2010 | Rivers, Jr. et al. |
| 7,864,006 | B2 | 1/2011 | Foster et al. |
| 7,864,491 | B1 | 1/2011 | Bauder et al. |
| 8,079,262 | B2 | 12/2011 | Guo |
| 8,194,382 | B2 | 6/2012 | Ellis et al. |
| 8,203,880 | B2 | 6/2012 | Schepens et al. |
| 8,230,788 | B2 | 7/2012 | Brooks et al. |
| 8,334,729 | B1 | 12/2012 | Khlat |
| 8,358,488 | B2 | 1/2013 | Premerlani et al. |
| 8,499,629 | B2 | 8/2013 | Ballas et al. |
| 8,610,519 | B2 | 12/2013 | Keimel et al. |
| 8,638,093 | B2 | 1/2014 | Aimi et al. |
| 8,861,218 | B2 | 10/2014 | Smith et al. |
| 8,916,996 | B2 | 12/2014 | Aimi et al. |
| 8,978,475 | B2 | 3/2015 | Acar |
| 9,077,060 | B2 | 7/2015 | Nguyen et al. |
| 9,117,610 | B2 | 8/2015 | Aimi et al. |
| 9,156,677 | B2 | 10/2015 | Bauder et al. |
| 9,159,516 | B2 | 10/2015 | Hammond et al. |
| 9,221,677 | B2 | 12/2015 | Kim |
| 9,362,608 | B1 | 6/2016 | Lee et al. |
| 9,739,875 | B2 | 8/2017 | Koptenko |
| 9,748,048 | B2 | 8/2017 | Fitzgerald et al. |
| 9,911,563 | B2 | 3/2018 | Macnamara et al. |
| 10,029,914 | B2 | 7/2018 | Huffman et al. |
| 10,033,179 | B2 | 7/2018 | Fitzgerald et al. |
| 10,068,733 | B2 | 9/2018 | Kiu et al. |
| 10,083,811 | B2 | 9/2018 | Kiu et al. |
| 10,141,495 | B1 | 11/2018 | Nordquist et al. |
| 10,254,361 | B2 | 4/2019 | Robb et al. |
| 10,388,468 | B2 | 8/2019 | Sampath et al. |
| 10,867,757 | B2 | 12/2020 | Nguyen et al. |
| 2002/0075094 | A1 | 6/2002 | Bechtle et al. |
| 2002/0186108 | A1 | 12/2002 | Hallbjorner |
| 2002/0186449 | A1 | 12/2002 | Anderson et al. |
| 2004/0031670 | A1 | 2/2004 | Wong |
| 2004/0113713 | A1 | 6/2004 | Zipper et al. |
| 2004/0155729 | A1 | 8/2004 | Ko et al. |
| 2006/0077504 | A1* | 4/2006 | Floyd ..................... H10D 89/60 359/237 |
| 2007/0139145 | A1 | 6/2007 | Subramanian et al. |
| 2009/0201119 | A1 | 8/2009 | Rubel |
| 2009/0272634 | A1 | 11/2009 | Ehlers et al. |
| 2011/0188174 | A1* | 8/2011 | Simper ................ H05K 7/1457 361/756 |
| 2012/0080737 | A1 | 4/2012 | Zaitsu et al. |
| 2012/0286588 | A1 | 11/2012 | Steeneken et al. |
| 2014/0305777 | A1* | 10/2014 | Aimi ....................... B81B 7/008 200/181 |
| 2016/0006241 | A1 | 1/2016 | Fitzgerald et al. |
| 2017/0225942 | A1 | 8/2017 | Fitzgerald et al. |
| 2019/0013668 | A1 | 1/2019 | Fitzgerald et al. |
| 2019/0049482 | A1 | 2/2019 | Motiee |
| 2019/0172671 | A1 | 6/2019 | Khlat et al. |
| 2019/0371554 | A1 | 12/2019 | Khlat |
| 2020/0025792 | A1 | 1/2020 | Reinke |
| 2020/0116487 | A1 | 4/2020 | Ward et al. |
| 2020/0343067 | A1 | 10/2020 | Schepens et al. |

FOREIGN PATENT DOCUMENTS

| | | | |
|---|---|---|---|
| CN | 110275286 | A | 9/2019 |
| DE | 102015110467 | A1 | 1/2016 |
| JP | 2007-174064 | A | 7/2007 |
| JP | 4348390 | B2 | 10/2009 |
| KR | 100522895 | B1 | 10/2005 |
| KR | 100678346 | B1 | 2/2007 |
| KR | 100717870 | B1 | 5/2007 |
| KR | 101468743 | B1 | 12/2014 |
| WO | WO 02/09224 | A1 | 1/2002 |
| WO | 2004061882 | | 7/2004 |
| WO | WO 2007/077353 | A2 | 7/2007 |
| WO | WO 2007/078589 | A1 | 7/2007 |
| WO | WO 2010/056435 | A2 | 5/2010 |
| WO | WO 2012/088821 | A1 | 7/2012 |
| WO | WO 2017/007428 | A1 | 1/2017 |
| WO | 2017134518 | | 8/2017 |

OTHER PUBLICATIONS

International Search Report and Written Opinion mailed Sep. 14, 2022 in connection with International Application No. PCT/US2022/029593.

International Preliminary Report on Patentability mailed Nov. 30, 2023 in connection with International Application No. PCT/US2022/029593.

International Search Report and Written Opinion mailed Oct. 14, 2022 in connection with International Application No. PCT/IB2022/000271.

International Preliminary Report on Patentability mailed Nov. 30, 2023 in connection with International Application No. PCT/IB2022/000271.

[No Author Listed], 300V, Low-Charge Injection, 16-Channel, High-Voltage Analog Switch. Microchip Technology Inc. HV2621/HV2721/HV2722. Sep. 2019; DS20006082A, 26 pages.

[No Author Listed], Low Charge Injection 32-Channel High Voltage Analog Switch with Bleed Resistor. Supertex, Inc., Part HV2901 Datasheet, 2012 [last accessed Dec. 19, 2023]. 10 pages.

[No Author Listed], MM3100—6 Channel SPST Digital-Micro-Switch. Menlo Microsystems, Inc., Application Note. Mar. 30, 2018; Doc Rev. MM3100App1 v1.0, 27 pages.

[No Author Listed], No High-Voltage Bias, Low Harmonic Distortion, 32-Channel, High-Voltage Analog Switch with L-Switch Architecture. Microchip Technology Inc. HV2070. Feb. 2019; DS20005923A, 34 pages.

Lin et al., A Resonance Dynamical Approach to Faster, More Reliable Micromechanical Switches. In2008 IEEE International Frequency Control Symposium May 19, 2008; pp. 640-645.

Yu et al., A Vibration-Based MEMS Piezoelectric Energy Harvester and Power Conditioning Circuit. Sensors. Feb. 19, 2014;14(2):3323-41.

(56) References Cited

OTHER PUBLICATIONS

"German Application Serial No. 112022002712.6, Response filed Oct. 14, 2025 to Office Action mailed Apr. 25, 2025", W/O English Claims, 79 pgs.

* cited by examiner

MEMS SWITCH FOR RF APPLICATIONS

CROSS-REFERENCE TO RELATED APPLICATIONS

This application is a Continuation of International Patent Application Serial No. PCT/US2022/029593, filed May 17, 2022, and entitled "IMPROVED MEMS SWITCH FOR RF APPLICATIONS," which is hereby incorporated herein by reference in its entirety.

International Patent Application Serial No. PCT/US2022/029593 claims the benefit under 35 U.S.C. § 119(e) of U.S. Provisional Application No. 63/190,227 entitled "MEMS SWITCH FOR RF APPLICATIONS," filed May 18, 2021, which is hereby incorporated herein by reference in its entirety.

FIELD OF THE DISCLOSURE

The present application relates to microelectromechanical system (MEMS) switches.

BACKGROUND

Some conventional MEMS switches include cantilevered beams. The switch is closed when the free end of the beam is pulled into contact with an underlying substrate by application of an electric field generated by applying a voltage to an electrode on the substrate. When no voltage is applied to the electrode on the substrate, and therefore no electric field is generated, the spring restoring force of the beam causes the free end of the beam to not contact the substrate, such that the switch is open. Often the MEMS switch opens and closes a connection to a circuit coupled to the MEMS switch.

BRIEF SUMMARY

Microelectromechanical systems (MEMS) switches are disclosed. Parallel configurations of back-to-back MEMS switches are disclosed in some embodiments. An isolation connection of constant electrical potential may be made to a midpoint of the back-to-back switches. In some embodiments, a shunt MEMS switch is provided to enhance isolation, for instance by increasing reflections. MEMS switch device configurations having multiple switchable signal paths each coupling a common input electrode to a respective output electrode are also disclosed. The MEMS switch device includes shunt switches each coupling a respective output electrode to a reference potential. The presence of a shunt switch coupled to an output electrode enhances the isolation of the signal path corresponding to that output electrode when the path is open.

Some embodiments relate to A microelectromechanical systems (MEMS) switch device, comprising: a first signal path comprising a first MEMS switch and a second MEMS switch in a back-to-back configuration with the first MEMS switch; and a second signal path comprising a third MEMS switch and a fourth MEMS switch in a back-to-back configuration with the third MEMS switch, wherein the first signal path is electrically coupled between a first and second electrode and the second signal path is electrically coupled between the first electrode and the second electrode.

In some embodiments, the first MEMS switch is a first teeter-totter switch comprising a first gate electrode, the second MEMS switch is a second teeter-totter switch comprising a second gate electrode, and the first gate electrode is coupled to the second gate electrode.

In some embodiments, the MEMS switch device further comprises a middle electrode electrically connected between the first MEMS switch and the second MEMS switch; and an isolation stub configured to connect the middle electrode to a reference potential.

In some embodiments, the MEMS switch device further comprises a shunt switch coupling the first electrode to a reference potential.

In some embodiments, the MEMS switch device further comprises a third signal path comprising a fifth MEMS switch and a sixth MEMS switch in a back-to-back configuration with the fifth MEMS switch; and a fourth signal path comprising a seventh MEMS switch and an eighth MEMS switch in a back-to-back configuration with the seventh MEMS switch, wherein the third signal path is electrically coupled between the first electrode and a third electrode and the fourth signal path is electrically coupled between the first electrode and the third electrode.

Some embodiments relate to a microelectromechanical systems (MEMS) switch device, comprising: first, second and third electrodes, wherein a first signal path is disposed between the first and second electrodes and a second signal path is disposed between the first and third electrodes; a first MEMS switch electrically coupled between the first and second electrodes and forming a portion of the first signal path when the first MEMS switch is closed; a second MEMS switch electrically coupled between the first and third electrodes and forming a portion of the second signal path when the second MEMS switch is closed; and a first shunt switch electrically coupled between the third electrode and a reference potential.

In some embodiments, the second MEMS switch and the first shunt switch are part of a common teeter-totter switch so that: when the teeter-totter switch is in a first state, the second MEMS switch is closed and the first shunt switch is open, and when the teeter-totter switch is in a second state, the second MEMS switch is open and the first shunt switch is closed.

In some embodiments, the MEMS switch device further comprises a controller configured to concomitantly close both the first MEMS switch and the first shunt switch.

In some embodiments, the controller is further configured to, concomitantly with closing the first MEMS switch, open the second MEMS switch.

In some embodiments, the MEMS switch device further comprises a second shunt switch electrically coupled between the second electrode and the reference potential.

In some embodiments, the controller is further configured to, concomitantly with closing the first MEMS switch, open the second shunt switch.

In some embodiments, the first shunt switch is electrically coupled to the reference potential by either a conductive pillar and/or a conductive bump.

In some embodiments, the first shunt switch is electrically coupled to the reference potential by a bond wire.

In some embodiments, the bond wire forms a quarter wave or half wave stub.

In some embodiments, the first shunt switch is electrically coupled to the reference potential by a $\lambda/2$ element.

In some embodiments, the MEMS switch further comprises an inductor/capacitor (LC) circuit coupled between the third electrode and the reference potential.

In some embodiments, the LC circuit comprises a vertical capacitor having first and second terminals, wherein the first terminal is formed on a pad that is connected to a wire bond and that lies on a first plane, and the second terminal lies on a second plane parallel to the first plane.

Some embodiments relate to a method for operating a microelectromechanical systems (MEMS) switch device comprising a first MEMS switch coupling a first electrode to a second electrode, a second MEMS switch coupling the first electrode to a third electrode, and a first shunt switch coupling the third electrode to a reference potential, the method comprising: forming a first signal path between the first electrode and the second electrode by closing the first MEMS switch; concomitantly with closing the first MEMS switch, forming a first shunt path between the third electrode and the reference potential by closing the first shunt switch; and concomitantly with closing the first MEMS switch, interrupting a second signal path between the first electrode and the third electrode by opening the second MEMS switch.

In some embodiments, the MEMS switch device further comprises a second shunt switch coupling the second electrode to the reference potential, and wherein the method further comprises: concomitantly with closing the first MEMS switch, interrupting a second shunt path between the second electrode and the reference potential by opening the second shunt switch.

In some embodiments, the second MEMS switch and the first shunt switch are part of a common teeter-totter switch, and wherein: opening the first shunt switch and closing the second MEMS switch collectively comprise switching the teeter-totter switch from a first state to a second state.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
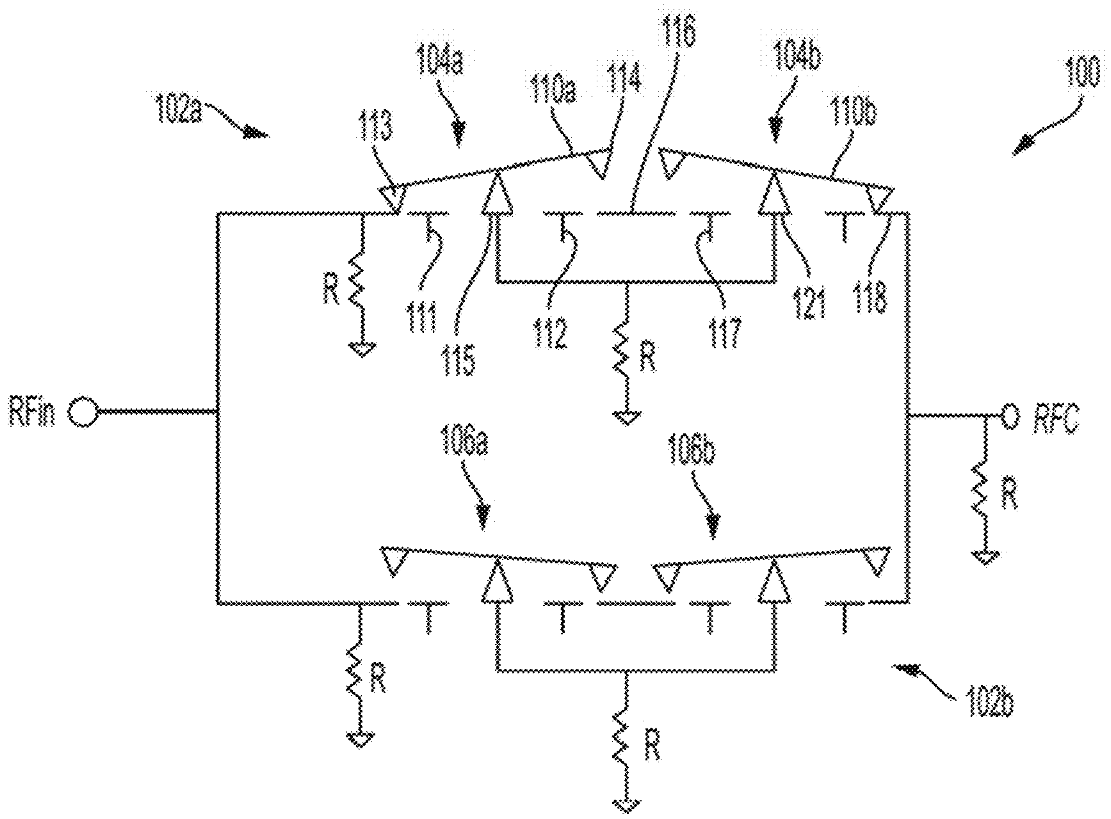
FIG. 1 is a circuit diagram of a MEMS switch configuration having back-to-back switches positioned in parallel signal paths, according to a non-limiting embodiment of the present application.

Aspects of the present application provide microelectromechanical systems (MEMS) switches in various configurations providing improved radio frequency (RF) performance. According to one aspect of the present application, a MEMS switch configuration includes two parallel paths of back-to-back MEMS switches. The back-to-back MEMS switches may be teeter-totter switches in some embodiments. The back-to-back configuration may provide enhanced isolation (e.g., the ability to block a signal from propagating from one terminal to another terminal as a result of a path being open), and the parallel path configuration may reduce insertion loss.

According to an aspect of the present application, a MEMS switch configuration includes back-to-back MEMS switches with an isolation stub. The isolation stub may control the reference potential of a midpoint between the back-to-back switches, such as fixing the potential to a constant reference. Doing so may improve the isolation performance of the MEMS switches.

According to another aspect of the present application, a MEMS switch configuration comprises a primary signal switch and a shunt switch. The shunt switch may form part of a shunt path deviating from the signal path. Closing the shunt switch when the primary signal switch is open may shunt any incoming signal through the shunt path to a sink, such as an absorptive pad. The isolation performance of the primary signal switch may be enhanced in this manner.

According to another aspect of the present application, a MEMS switch configuration includes multiple signal switches disposed along signal paths each branching from a common input electrode and coupling to a respective output electrode. In some embodiments, for example, the MEMS switch configuration has two signal paths arranged in this way. The switches may be configured to that, when one switch is closed the other switch is open, and vice versa. In this way, a signal input at the common input electrode is couples to either signal path, but not both. This arrangement may be used to dynamically steer signals to different locations of a circuit depending upon the user's needs over time. The inventors have appreciated that having switchable paths coupled to a common input electrode in this way presents a challenge. When a signal is transmitted along one of the switchable paths (e.g., from the common input electrode to one of the output electrodes), part of the energy carried by the signal may inadvertently couple to the other switchable path despite the fact the other switchable path is open. For example, energy may transmit across the open switch via capacitive coupling. The result is that the isolation that the open switch is intended to provide is degraded, and part of the signal energy is lost in a path where the signal is supposed to be absent. To obviate this problem, in some embodiments, shunt switches are coupled between the respective output electrodes and a reference potential (e.g., ground or a fixed potential of a voltage supply). A shunt switch coupling an output electrode to the reference potential may be arranged to reflect the energy passing through the open switch back to the common input terminal. The isolation performance of the unused signal path may be enhanced in this manner.

The inventors have further appreciated that the effectiveness of the shunt switches discussed above may degrade in circumstances in which the circuit electrodes are connected to other electronic devices via wire bonds. A wire bond exhibits a large inductance, and as a result, behaves as a quarter-wave resonator. At the resonant frequency, the resonator absorbs energy provided to it and effectively behaves as an open circuit. This means that the shunt switch is unable to couple the undesired signal to the reference potential, thus negating the very purpose for which the shunt switch was introduced—to reflect undesired signals capacitively coupling across an open switch. In some embodiments, this problem can be obviated using one or more of the following circuit elements: a quarter-wave open stub behaving as a short at the resonant frequency, a half-wave shorted stub also behaving as a short at the resonant frequency and/or an inductive-capacitive (LC) resonator shorted stub also behaving as a short at the resonant frequency.

According to another aspect of the present application, a MEMS switch configuration includes one or more teeter-totter switches. Teeter-totter switches include a beam configured to pivot about a central point such that the switch may be closed in one direction and open in another. The beam may be constructed to resist bending more than a cantilevered beam and in this manner may be more robust than cantilevered MEMS switch configurations.

The aspects and embodiments described above, as well as additional aspects and embodiments, are described further below. These aspects and/or embodiments may be used individually, all together, or in any combination of two or more, as the application is not limited in this respect.

As described above, according to an aspect of the present application, a MEMS switch configuration includes two parallel paths of back-to-back MEMS switches. FIG. 1 is an electrical diagram of a non-limiting example, showing a single-pole-single-throw (SPST) switch. The MEMS switch configuration 100 comprises two switch paths 102*a* and 102*b*. The switch path 102*a* is between a first shared signal terminal RFin and a second shared signal terminal RFC. The switch path 102*a* includes two MEMS switches 104*a* and 104*b* in a back-to-back configuration (e.g., the two MEMS switches 104*a* and 104*b* are arranged in series). The switch path 102*b* is arranged in parallel to the switch path 102*a* and is between the shared signal terminals RFin and RFC. The switch path 102*b* includes two MEMS switches 106*a* and 106*b* in a back-to-back configuration. The MEMS switch configuration 100 also includes a resistor R at several locations in this non-limiting embodiment. R may have any suitable value. It should be appreciated that in some embodiments, the value of R may be the same for every resistor in the circuit of FIG. 1, while in some embodiments the value of R may be different for one or more resistors in the circuit of FIG. 1, as aspects of the present application are not limited in this regard. In some embodiments, R may be on the order of 10 MΩ.

The MEMS switches 104*a* and 104*b* of switch path 102*a* may be any suitable type of MEMS switches that can be arranged in a back-to-back configuration. In this example, the MEMS switches 104*a* and 104*b* are teeter-totter MEMS switches. The MEMS switch 104*a* comprises a beam 110*a*, electrodes 111, 112, 113, and 114, and anchor 115. In some embodiments, beam 110*a* may comprise a conductive material, such as gold, nickel, or any other suitable conductive material. Beam 110*a* may connect to anchor 115 in any suitable manner, such as with one or more tethers. The anchor 115 may be disposed on a substrate (not shown in FIG. 1). For example, anchor 115 may be disposed on a substrate of a silicon wafer. However, the application is not limited in this respect and any other suitable type of substrate can be used. In some embodiments, anchor 115 may be disposed on a layer of silicon dioxide, which may be positioned on the substrate. In some embodiments, beam 110*a* may be held solely by anchor 115, and may be suspended over the substrate. Electrodes 113 and 114 may be formed on either end of beam 110*a*, for example being positioned near opposite edges of beam 110*a* with the remaining electrodes being on the substrate.

An electrode 116 is also provided and is common to the MEMS switch 104*a* and MEMS switch 104*b*. That is, each of MEMS switches 104*a* and 104*b* can contact electrode 116.

MEMS switch 104*a* is controllable with the electrodes 111 and 112, which may act as gate electrodes. Voltages applied to those electrodes create an electrostatic force attracting or repelling the beam 110*a*. For example, a voltage may be applied to electrode 111 to cause the beam 110*a* to pivot about the anchor 115 such that electrode 113 makes electrical contact with the RFin terminal. Applying a voltage to electrode 112 may cause the beam 110*a* to pivot about the anchor 115 such that electrode 114 contacts electrode 116.

The MEMS switches 104*b*, 106*a*, and 106*b* all have the same general structure as MEMS switch 104*a* in this example, with a beam pivoting about an anchor. The beams make electrical contact with electrodes positioned under either end of the beam.

The MEMS switches 104*a* and 104*b* are arranged in a back-to-back configuration. As described previously, MEMS switches 104*a* and 104*b* share a common electrode 116. A voltage may be applied to electrodes 111 and 118, causing beam 110*a* to be in electrical contact with the RFin terminal and beam 110*b* to be in electrical contact with the RFC terminal. In this configuration, a signal applied to the RFin terminal passes through the beam 110*a*, through the anchor 115 to anchor 121—which is electrically coupled to anchor 115—and through the beam 110*b* to the RFC terminal. Thus, the signal path 102*a* is conductive when both MEMS switches 104*a* and 104*b* are closed, which occurs when beam 110*a* is in electrical contact with the RFin terminal and beam 110*b* is in electrical contact with the RFC terminal. The MEMS switch 102*a* may be opened by applying a voltage to electrode 112 to cause electrode 114 to contact electrode 116. The MEMS switch 102*b* may be opened by applying a voltage to electrode 117 to cause beam 110*b* to contact electrode 116.

The MEMS switches 104*a* and 104*b* may be operated in unison. In some embodiments, the electrodes 111 and 118 may be electrically tied together, and the electrodes 112 and 117 may be electrically tied together. Voltages may be applied to those electrodes as appropriate to open and close the MEMS switches 104*a* and 104*b* as desired.

The MEMS switches 106*a* and 106*b* of switch path 102*b* may be configured and operated in the same manner as described above for the MEMS switches 104*a* and 104*b* of signal path 102*a*. In some embodiments, the MEMS switches 104*a*, 104*b*, 106*a*, and 106*b* may all be operated in unison, having gate electrodes electrically tied to each other so that all four switches are closed together and opened together.

The switch configuration 100 may provide beneficial isolation and insertion loss performance. The back-to-back configuration of MEMS switches 104*a* and 104*b*, and the back-to-back configuration of MEMS switches 106*a* and 106*b*, may provide enhanced isolation compared to having a single switch in each signal path. Thus, greater voltage isolation and RF isolation between the RFin terminal and the RFC terminal may be achieved. The electrically-parallel arrangement of switch paths 102*a* and 102*b* may reduce insertion loss compared to having just a single switch path between the RFin terminal and the RFC terminal.

Figure 2:
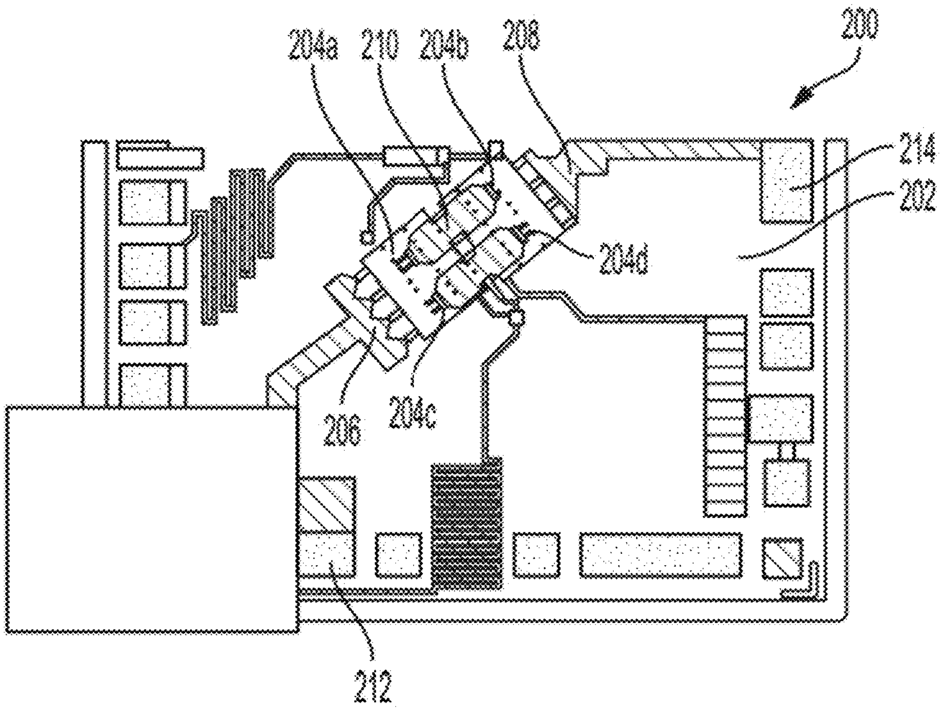
FIG. 2 is a schematic top view of an implementation of the MEMS switch configuration of FIG. 1, according to a non-limiting embodiment of the present application.

FIG. 2 is a schematic top view of an implementation of the MEMS switch configuration of FIG. 1, according to a non-limiting embodiment of the present application. The switch configuration 200 comprises a die (or chip) 202, four teeter-totter switches 204*a*, 204*b*, 204*c*, and 204*d*, two electrodes 206 and 208, and a middle electrode 210. The switch configuration 200 further comprises two electrical pads 212 and 214.

The teeter-totter switches 204*a* and 204*b* are arranged in a back-to-back configuration between electrodes 206 and 208. The teeter-totter switches 204*c* and 204*d* are arranged in a back-to-back configuration between electrodes 206 and 208. The teeter-totter switches 204*a* and 204*b* are electrically in parallel with the teeter-totter switches 204*c* and 204*d*.

The teeter-totter switches 204*a*-204*d* may each have the configuration of the MEMS switches of FIG. 1.

The middle electrode 210 is a single electrode shared by all four tetter-totter switches 204*a*-204*d* in this non-limiting example.

Figure 3:
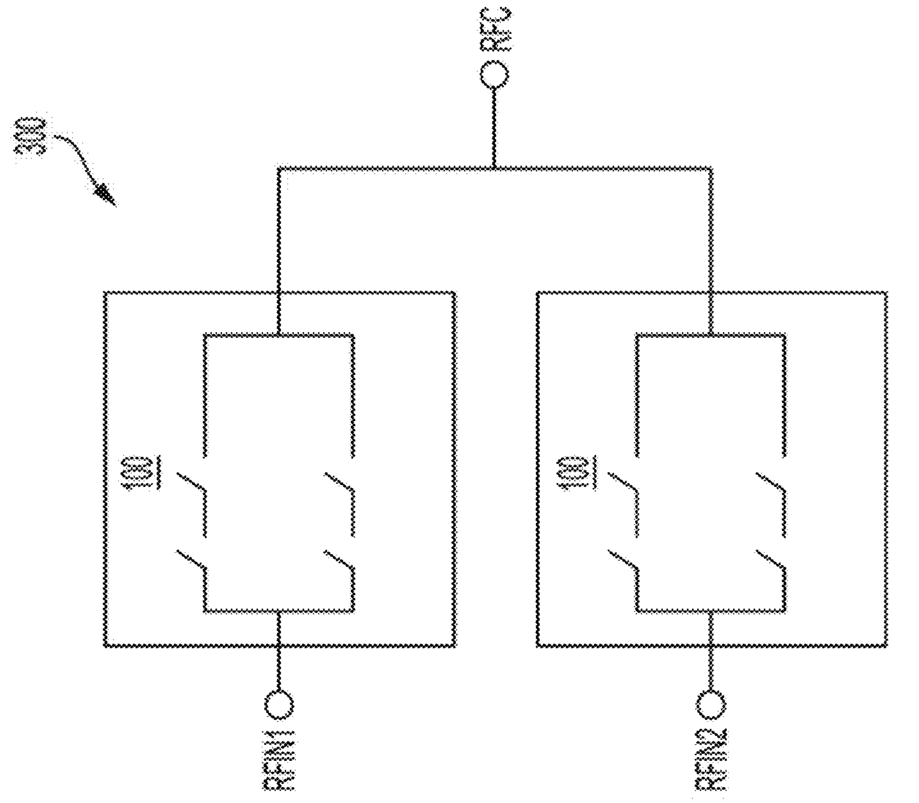
FIG. 3 is a circuit diagram of a MEMS switch configuration having two signal paths with back-to-back MEMS switches that share one terminal but are connected to separate electrical terminals at another end of the signal paths.

According to an aspect of the present application, two signal paths with back-to-back MEMS switches may share one terminal but may be connected to separate electrical terminals at another end of the signal paths. FIG. 3 illustrates an example.

The MEMS switch configuration 300 of FIG. 3 comprises two instances of MEMS switch configuration 100 of FIG. 1, although the MEMS switch configurations 100 are shown in simplified form in FIG. 3 for ease of illustration. Both instances of MEMS switch configuration 100 in FIG. 3 are coupled on one end to the common terminal RFC. However, one instance of MEMS switch configuration 100 is coupled to a first terminal RFIN1 and the other instance of MEMS switch configuration 100 is coupled to a second terminal RFIN2. RFIN1 and RFIN2 may be couplable to different electrical signals. Thus, the two instances of MEMS switch configuration 100 are not in parallel.

Figure 4:
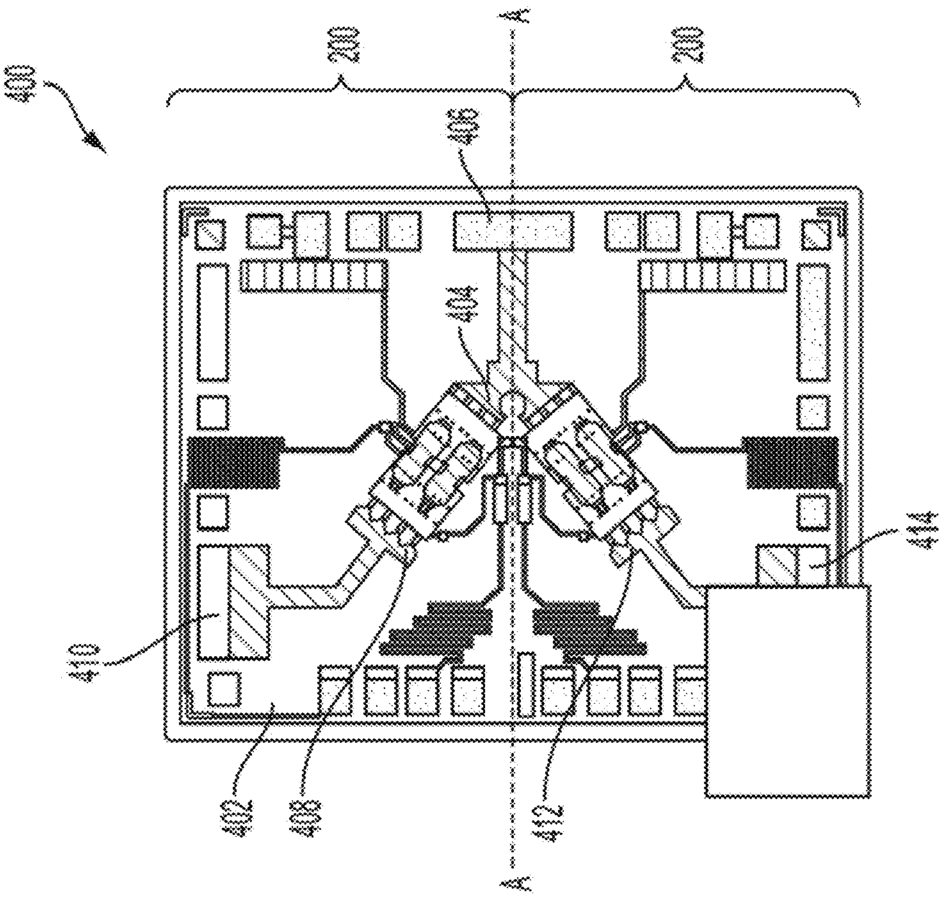
FIG. 4 is a schematic top view of an implementation of the MEMS switch configuration of FIG. 3, according to a non-limiting embodiment of the present application.

The MEMS switch configuration 300 may be implemented with a physical layout providing beneficial RF behavior. FIG. 4 illustrates a non-limiting example. The MEMS switch configuration 400 of FIG. 4 comprises a die 402 with two instances of the MEMS switch configuration 200 of FIG. 2 arranged symmetrically about the line A-A. That means there are a total of eight MEMS switches arranged in four pairs of back-to-back switches. Two of those pairs are in parallel with each other, and the other two pairs are in parallel with each other. As shown, the two instances of MEMS switch configuration 200 share a common electrode 404 accessible via a pad 406. However, one instance of the MEMS switch configuration 200 connects to a first electrode 408 accessible via a pad 410, while the other instances of the MEMS switch configuration 200 connects to a second electrode 412 accessible via a pad 414.

The MEMS switches of the MEMS switch configuration 400 may be operated with any suitable relative timing. For example, in some embodiments, the MEMS switches between electrode 404 and electrode 408 may be closed when the MEMS switches between electrode 404 and electrode 412 are open, and vice versa. Other relative timing sequences are also possible.

The mirror symmetry of MEMS switch configuration 400 may provide fabrication benefits. For instance, the mirror symmetry may simplify positioning of the illustrated components on the die 402. Photolithographic mask layout may be simplified, and cost may be reduced.

The Y-shaped configuration of the signal paths of MEMS switch configuration 400 may also provide benefits. The "Y" is formed by the signal path from pad 410 to pad 406, and from pad 414 to pad 406. The two signal paths may be substantially the same length as each other, which may be beneficial in controlling signal timing and avoiding undesirable reflections or other detrimental behavior.

Figure 5:
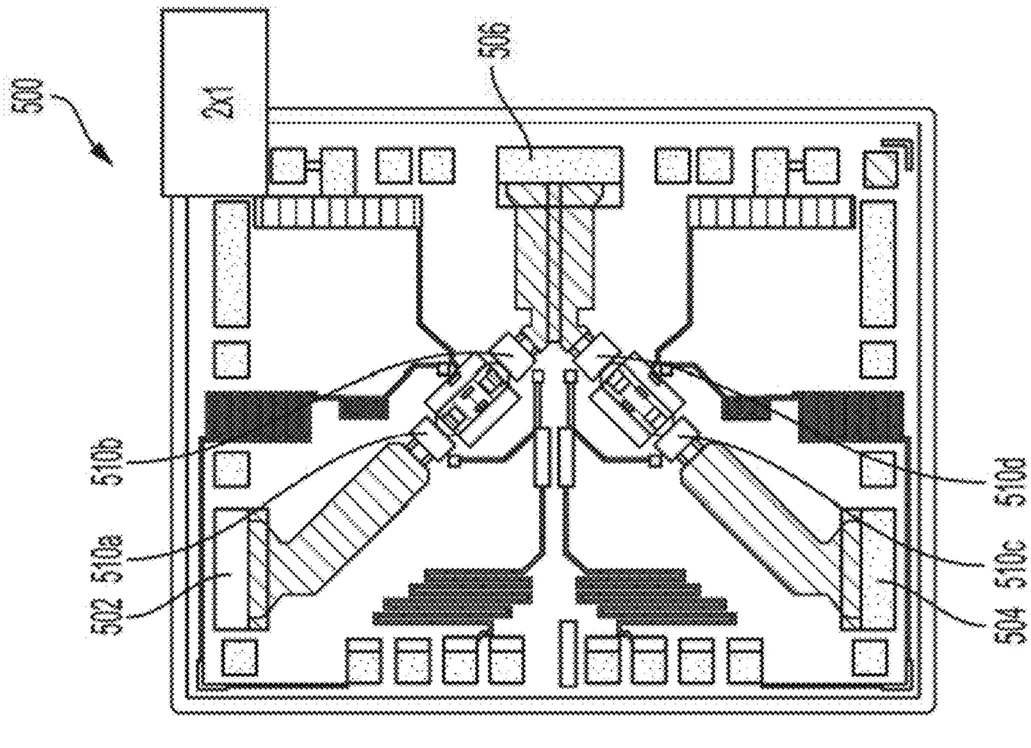
FIG. 5 is a schematic top view of a MEMS switch configuration having two signal paths with back-to-back MEMS switches, according to a non-limiting embodiment of the present application.

The Y-shaped configuration of FIG. 4 is not limited to MEMS switch configurations having signal paths with parallel back-to-back switches. FIG. 5 is a schematic top view of a MEMS switch configuration 500 having two signal paths with back-to-back MEMS switches, according to a non-limiting embodiment of the present application. In this example, the signal path from pad 502 to 506 has two MEMS switches 510*a* and 510*b* in a back-to-back configuration but does not have a parallel arrangement of back-to-back switches. The signal path from pad 504 to pad 506 also has two MEMS switches 510*c* and 510*d* arranged in a back-to-back configuration but does not have a parallel arrangement of back-to-back switches. As shown, the signal path from pad 502 to pad 506 in combination with the signal path from pad 504 to pad 506 forms a Y.

Figure 6:
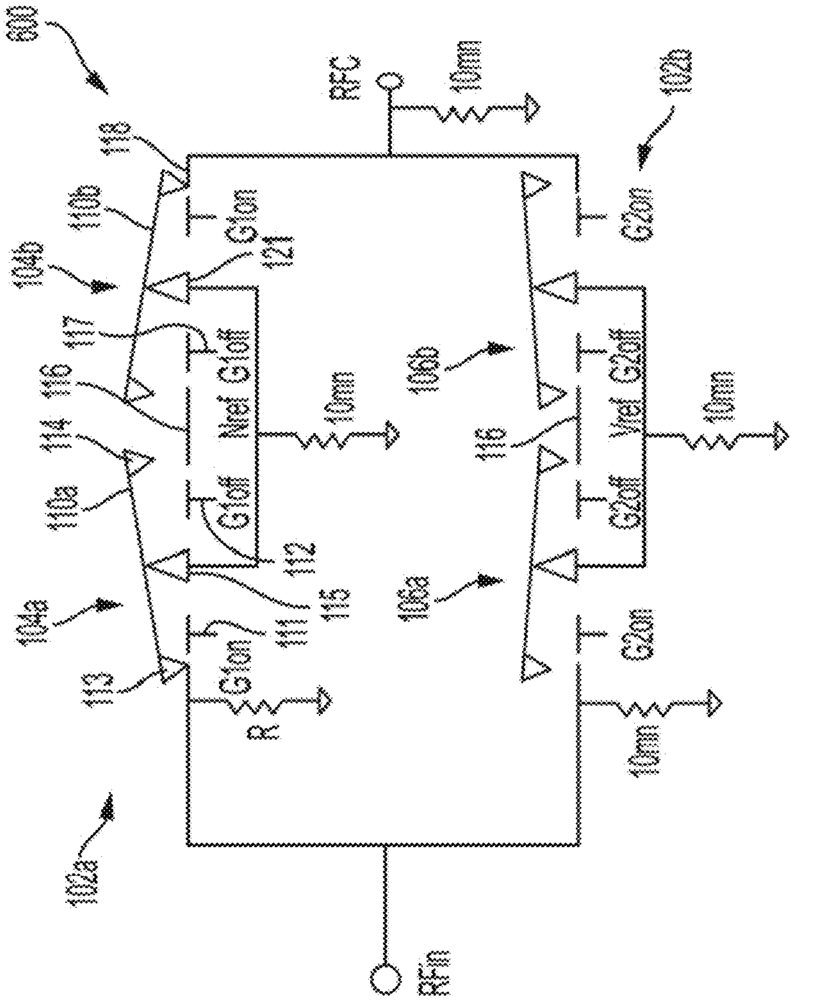
FIG. 6 is a circuit diagram of a MEMS switch configuration having back-to-back switches positioned in parallel signal paths and having a middle electrode connected to an isolation stub, according to a non-limiting embodiment of the present application.

As described previously, according to an aspect of the present application, a MEMS switch configuration includes back-to-back MEMS switches with an isolation stub. The isolation stub may control the reference potential of a midpoint between the back-to-back switches, such as fixing the potential to a constant reference. Doing so may improve the isolation performance of the MEMS switches. In some embodiments, the isolation stub may reflect RF energy. FIG. 6 illustrates a non-limiting example.

The MEMS switch configuration 600 of FIG. 6 is the same in many respects as the MEMS switch configuration 100 of FIG. 1. Thus, those components described previously in connection with FIG. 1 are not described again in detail here. The MEMS switch configuration 600 differs from the MEMS switch configuration 100 in that the electrodes 116 are coupled by a stub to a reference voltage Vref. In some embodiments, Vref is a ground potential. The stub may take any suitable form. For example, the stub may be a trace on a die. In some embodiments, it is an LC resonator. In some embodiments, it is a quarter or half wave stub. The stub may be connected to any suitable reference voltage Vref. In the illustrated embodiment, both electrodes 116 are connected to the same reference voltage. Connecting the electrodes 116 to a reference voltage improves the isolation provided by the back-to-back switches between the terminal RFin and terminal RFC.

Figure 7:
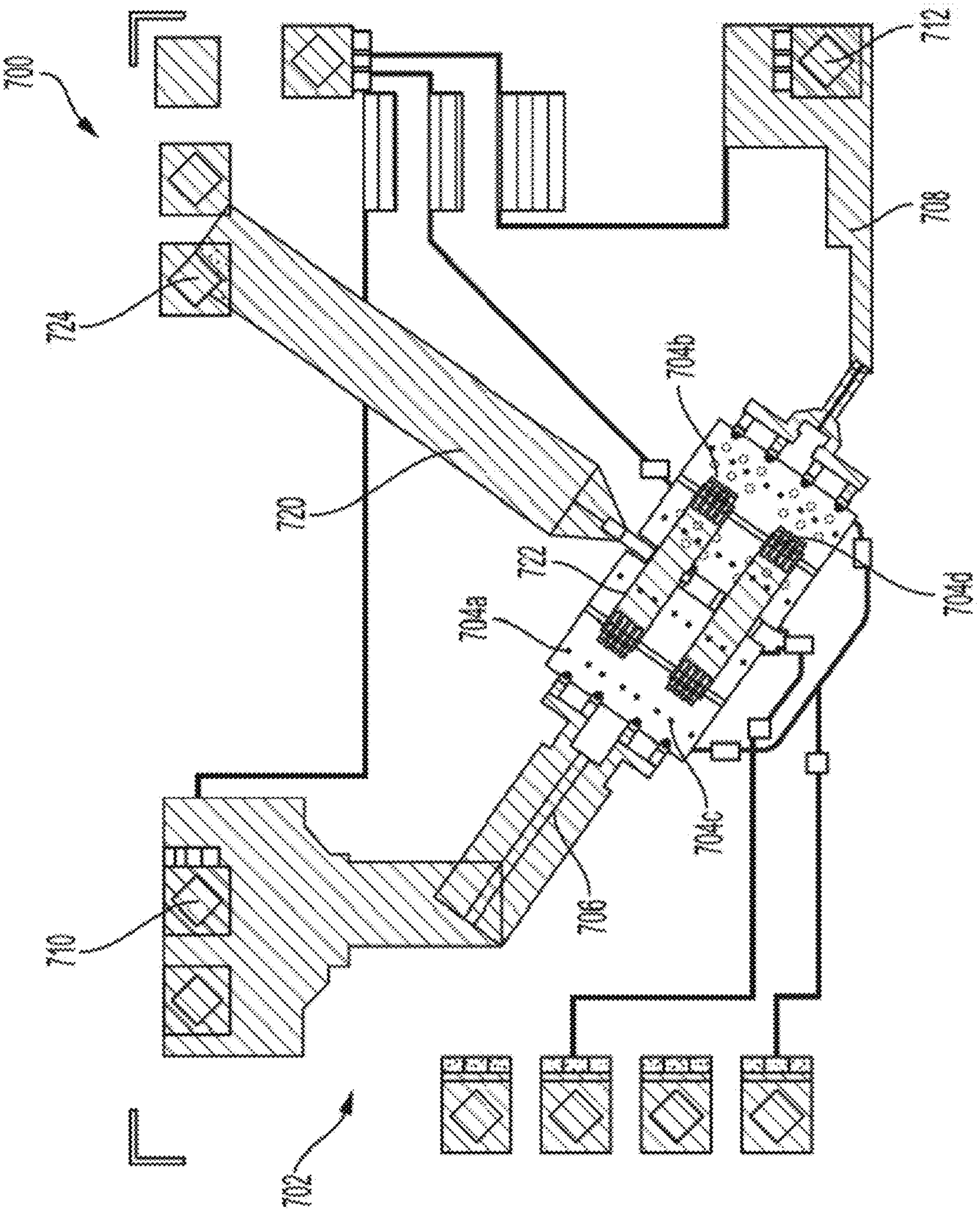
FIG. 7 is a schematic top view of an implementation of the MEMS switch configuration of FIG. 6, according to a non-limiting embodiment of the present application.

FIG. 7 is a schematic top view of an implementation of the MEMS switch configuration 600 of FIG. 6, according to a non-limiting embodiment of the present application. The MEMS switch configuration 700 comprises a die 702 on which four MEMS switches 704*a*, 704*b*, 704*c*, and 704*d* are disposed. The MEMS switches 704*a* and 704*b* are in a back-to-back configuration between electrodes 706 and 708. The MEMS switches 704*c* and 704*d* are in a back-to-back configuration between electrodes 706 and 708. The MEMS switches 704*a* and 704*b* are electrically parallel to MEMS switches 704*c* and 704*d*. Pad 710 provides access to electrode 706. Pad 712 provides access to electrode 708.

As shown, the MEMS switch configuration 700 comprises a stub 720. The stub 720 is electrically connected to the electrode 722 and is accessible by pad 724. The electrode 722 serves as the midpoint between MEMS switches 704*a* and 704*b*, and between MEMS switches 704*c* and 704*d*. The pad 724 may be coupled to a reference potential. In this manner, the midpoints between the MEMS switches may be biased at a reference potential. Such biasing may improve the isolation provided by the MEMS switches between electrode 706 and 708.

The stub 720 may take any suitable form. In the example shown, the stub 720 is a trace on the die 702. The stub may have any suitable shape and length. In some embodiments the stub is a short to ground. In some embodiments, the stub is an LC resonator. In some embodiments, it is a half wave stub with a short to ground. The shape and length of stub 720 shown in FIG. 7 is a non-limiting example.

Figure 8:
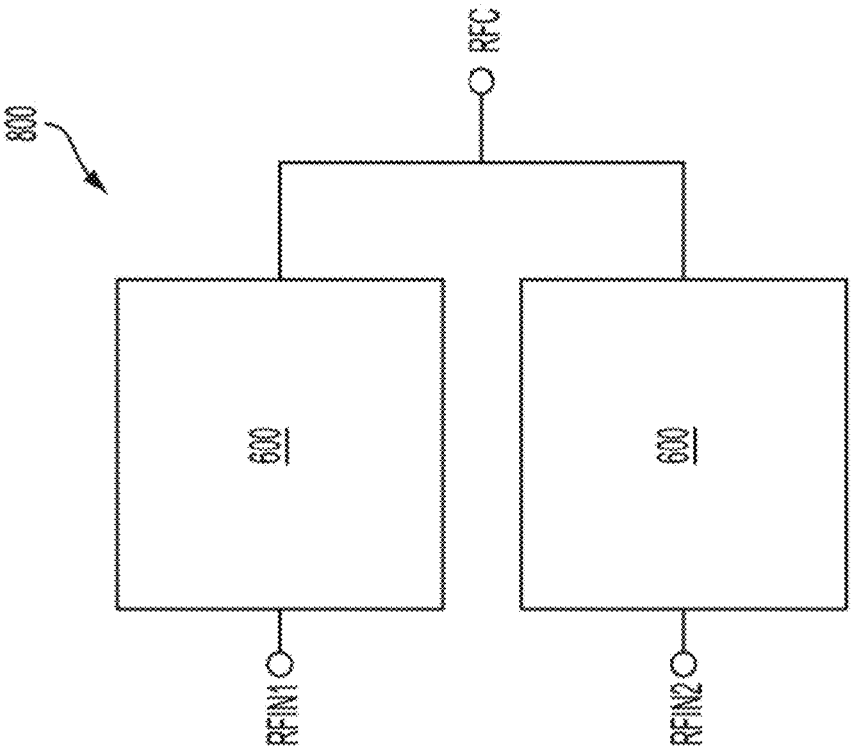
FIG. 8 is a circuit diagram of a MEMS switch configuration having two signal paths with back-to-back MEMS switches that share one terminal but are connected to separate electrical terminals at another end of the signal paths, and which include isolation stubs configured to bias a middle electrode of the back-to-back switches.

The use of an isolation stub to bias a middle electrode of a back-to-back MEMS switch configuration is not limited to the configurations of FIGS. 6 and 7. For example, MEMS switch configurations having two signal paths sharing a common electrode on one end but connected to different electrodes on the opposite end, and each signal path having back-to-back MEMS switches, may include an isolation stub in both signal paths. FIG. 8 illustrates a non-limiting example.

The MEMS switch configuration 800 of FIG. 8 includes two instances of the MEMS switch configuration 600 of FIG. 6. Thus, each instance has a parallel arrangement of back-to-back MEMS switches with an isolation stub configured to bias a middle electrode of the back-to-back switches. In this example, the two MEMS switch configurations share a common terminal RFC but connect to different electrodes on the opposite end. Specifically, one instance of the MEMS switch configuration 600 connects to terminal RFIN1 and the other instance connects to terminal RFIN2.

Figure 9:
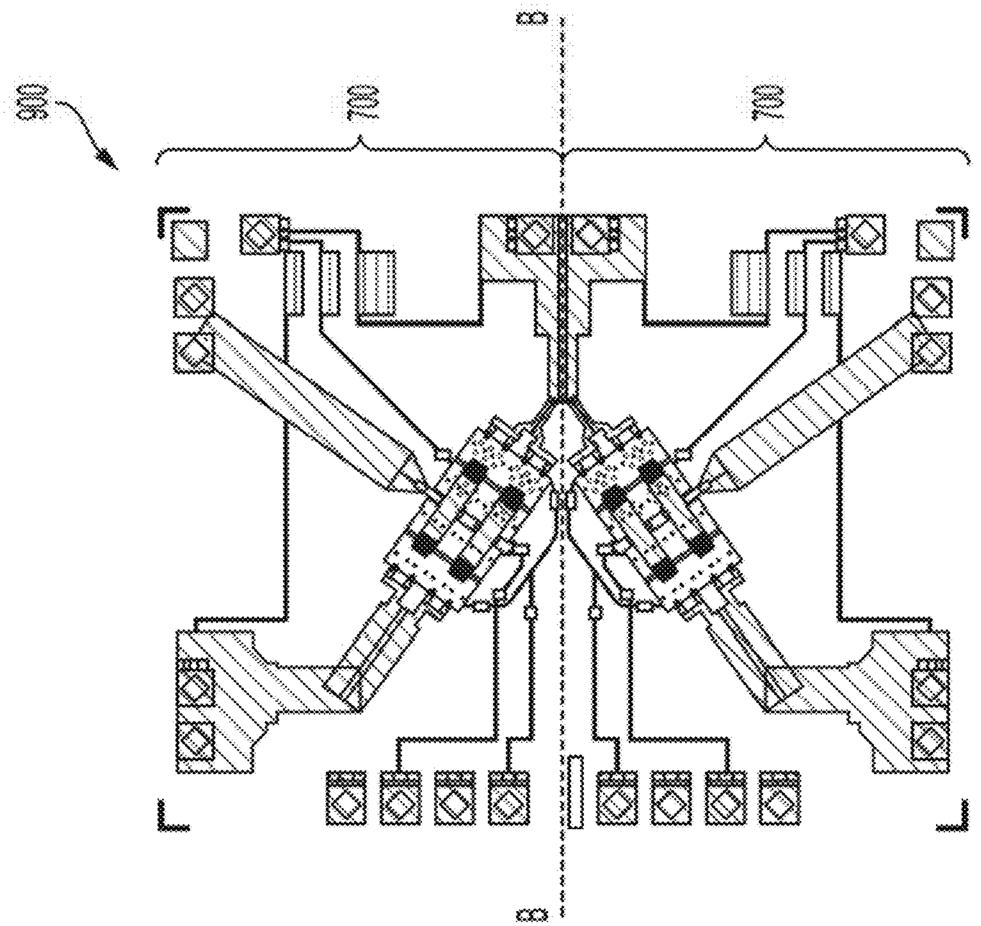
FIG. 9 is a schematic top view of an implementation of the MEMS switch configuration of FIG. 8, according to a non-limiting embodiment of the present application.

FIG. 9 is a top schematic view of an implementation of the MEMS switch configuration 800 of FIG. 8, according to a non-limiting embodiment of the present application. The MEMS switch configuration has two instances of the MEMS switch configuration 700 of FIG. 7 arranged in mirror symmetry about the line B-B. There are thus two signal paths, arranged in a Y.

As described above, according to another aspect of the present application, a MEMS switch configuration comprises a primary signal switch and a shunt switch. The shunt switch may form part of a shunt path deviating from the signal path. Closing the shunt switch when the primary signal switch is open may shunt any incoming signal through the shunt path to a sink, such as an absorptive pad if there is a 50Ω termination. Alternatively, the shunt may be designed to reflect RF energy. The isolation performance of the primary signal switch may be enhanced in this manner. Also, the use of the shunt switch may reduce or eliminate signal reflections which could otherwise occur off the open primary signal switch.

Figure 10:
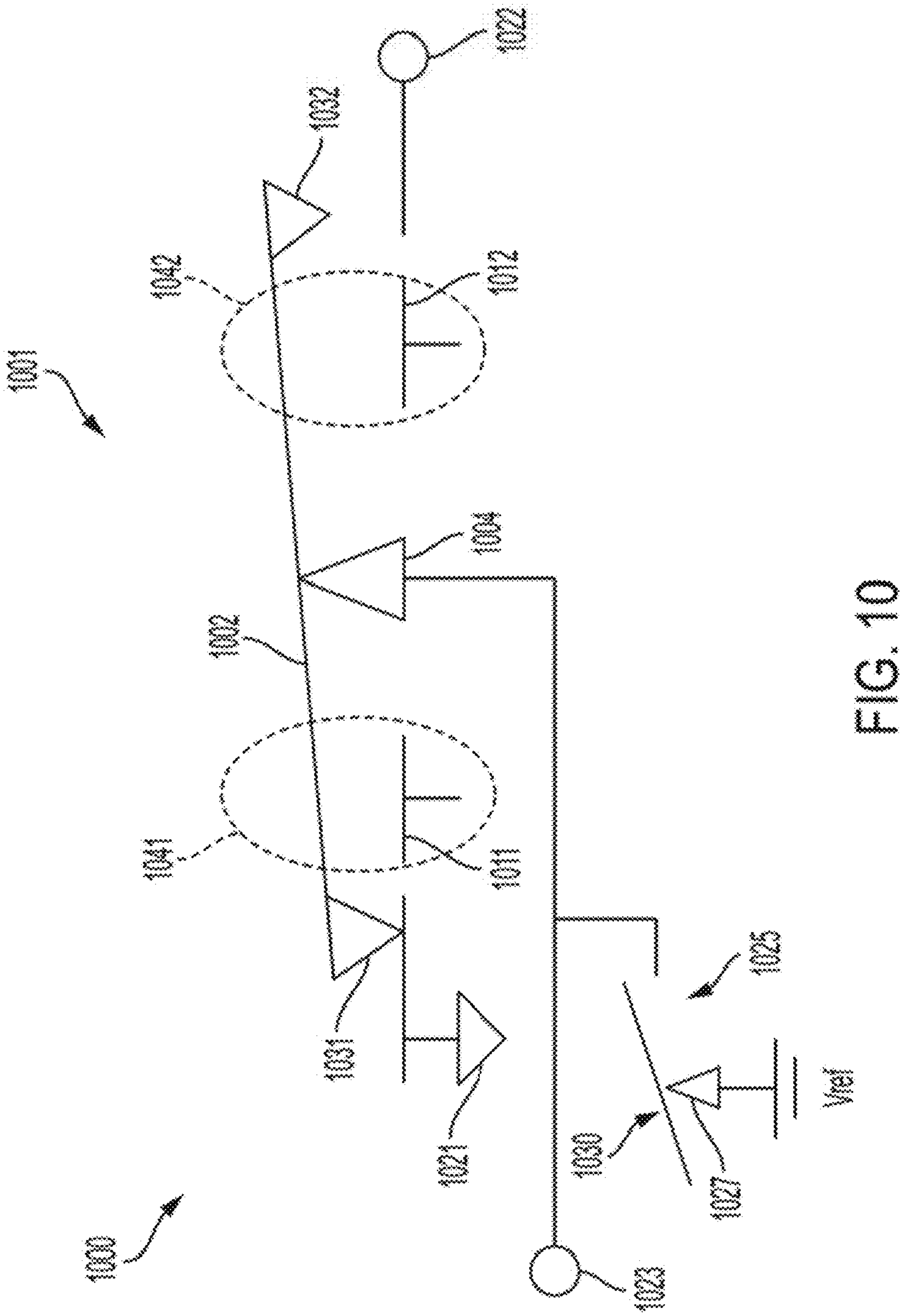
FIG. 10 is a circuit diagram of a MEMS switch configuration having a shunt switch, according to a non-limiting embodiment of the present application.

FIG. 10 is an electrical diagram of a MEMS switch configuration having a shunt switch, according to a non-limiting embodiment of the present application. The MEMS switch configuration 1000 comprises an input terminal 1023, output terminal 1022, and teeter-totter MEMS switch 1001 having a beam 1002, back contact 1031, front contact 1032, anchor 1004, gate electrodes 1011 and 1012. The beam 1002 and gate electrode 1011 form a first capacitance 1041. The beam 1002 and gate electrode 1012 form a second capacitance 1042. The MEMS switch configuration 1000 further comprises a shunt MEMS switch 1025, comprising a beam 1030 and anchor 1027.

In operation, a signal may be passed from the input terminal 1023 to the output terminal 1022 via the beam 1002 when a voltage is applied to gate electrode 1012 suitable to pull the beam 1002 such that contact 1032 is in electrical contact with output terminal 1022. The MEMS switch 1001 may therefore be considered the signal switch in the illustrated embodiment, as it is used to pass a signal when desired. The MEMS switch 1001 may be opened by applying a voltage on gate electrode 1011 suitable to bring contact 1031 into electrical contact with electrode 1021.

The inventors have appreciated that including shunt switch 1025 in the MEMS switch configuration 1000 improves performance. The shunt switch 1025 may enhance the isolation provided by MEMS switch 1001 when opened. Closing shunt switch 1025 when MEMS switch 1001 is opened may reflect RF energy.

The shunt switch 1025 may be any suitable MEMS switch. In some embodiments, such as that shown, the shunt switch 1025 may be a teeter-totter MEMS switch. In some embodiments, the shunt switch 1025 may be a cantilever beam MEMS switch. The aspects of the present application providing a shunt switch are not limited to the type of MEMS switch used as the shunt switch.

Figure 11:
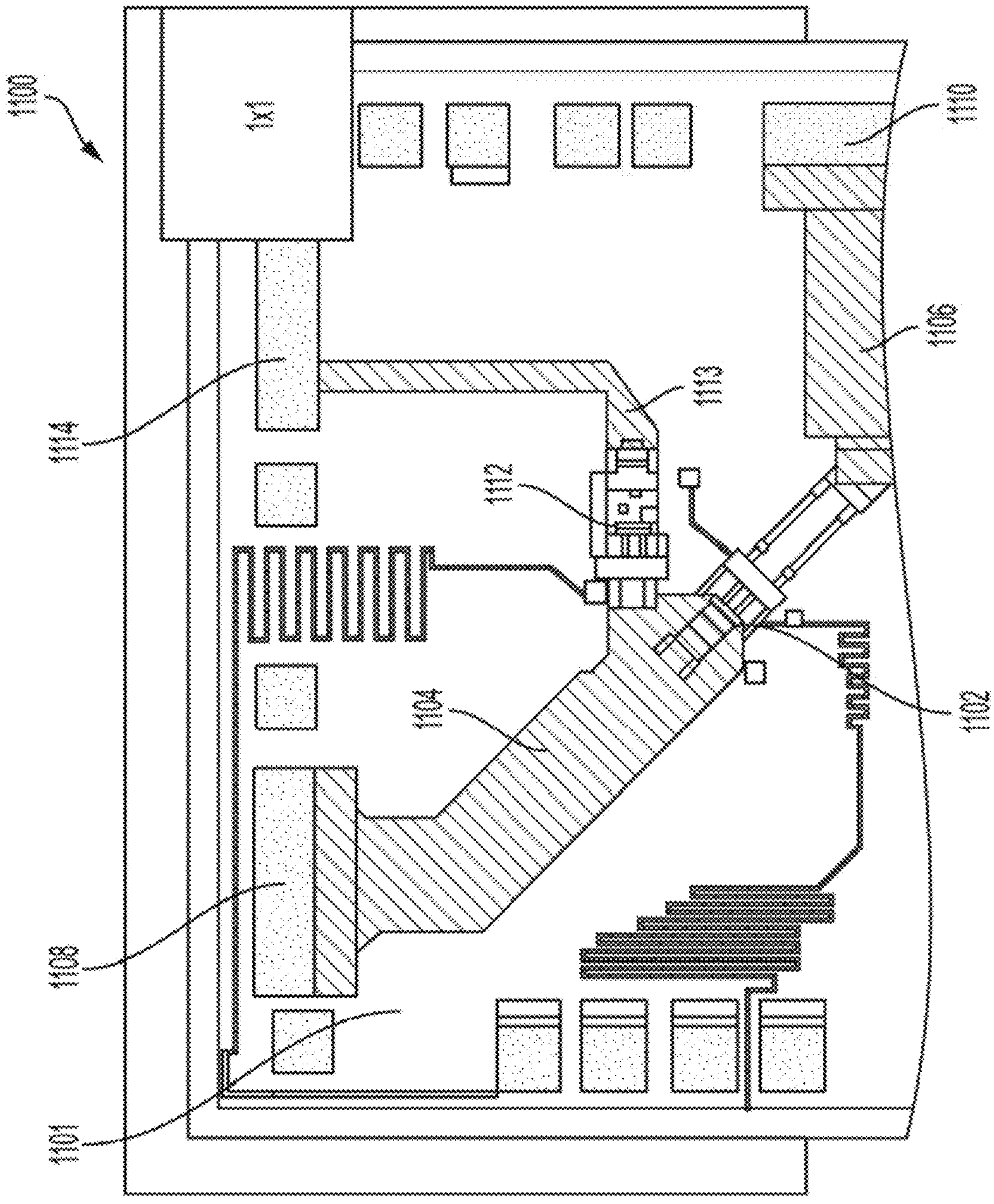
FIG. 11 is a schematic top view of an implementation of the MEMS switch configuration of FIG. 10, according to a non-limiting embodiment of the present application.

FIG. 11 is a schematic top view of an implementation of the MEMS switch configuration 1000 of FIG. 10. The MEMS switch configuration 1100 comprises a die 1101 having a MEMS signal switch 1102 between electrodes 1104 and 1106. Electrode 1104 is accessible via pad 1108. Electrode 1106 is accessible via pad 1110. The MEMS switch configuration further comprises shunt switch 1112 between electrode 1104 and electrode 1113, which is accessible via pad 1114. In this example, MEMS signal switch 1102 and shunt switch 1112 are both MEMS teeter-totter switches.

The MEMS signal switch 1102 and shunt switch 1112 may be the same or different. For instance, in some embodiments they may be the same type of switches, having the same dimensions. In other embodiments, they may differ in design, material, and/or dimensions. For example, in some embodiments the shunt switch may be physically smaller than the signal switch.

Figure 12:
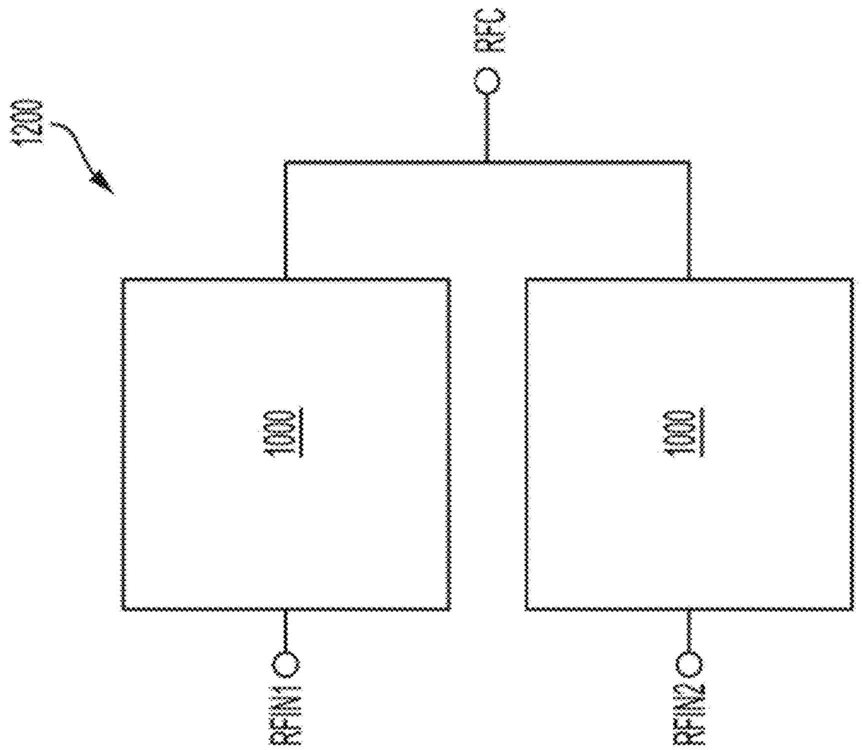
FIG. 12 is a circuit diagram of a MEMS switch configuration having two signal paths with shunt switches, according to a non-limiting embodiment of the present application.

The use of shunt switches of the types described above may be used in other switch configurations than those shown in FIGS. 10 and 11. For example, FIG. 12 is an electrical diagram of a MEMS switch configuration having two signal paths which share a common terminal on one end and connect to different terminals on their opposite ends, and which may each include a shunt switch of the types described. The MEMS switch configuration 1200 comprises two instances of the MEMS switch configuration 1000 of FIG. 10. The two instances of the MEMS switch configuration 1000 share a common terminal RFC. One instance of the MEMS switch configuration 1000 connects to a first terminal RFIN1, and the other instance of the MEMS switch configuration 1000 connects to a second terminal RFIN2.

Figure 13:
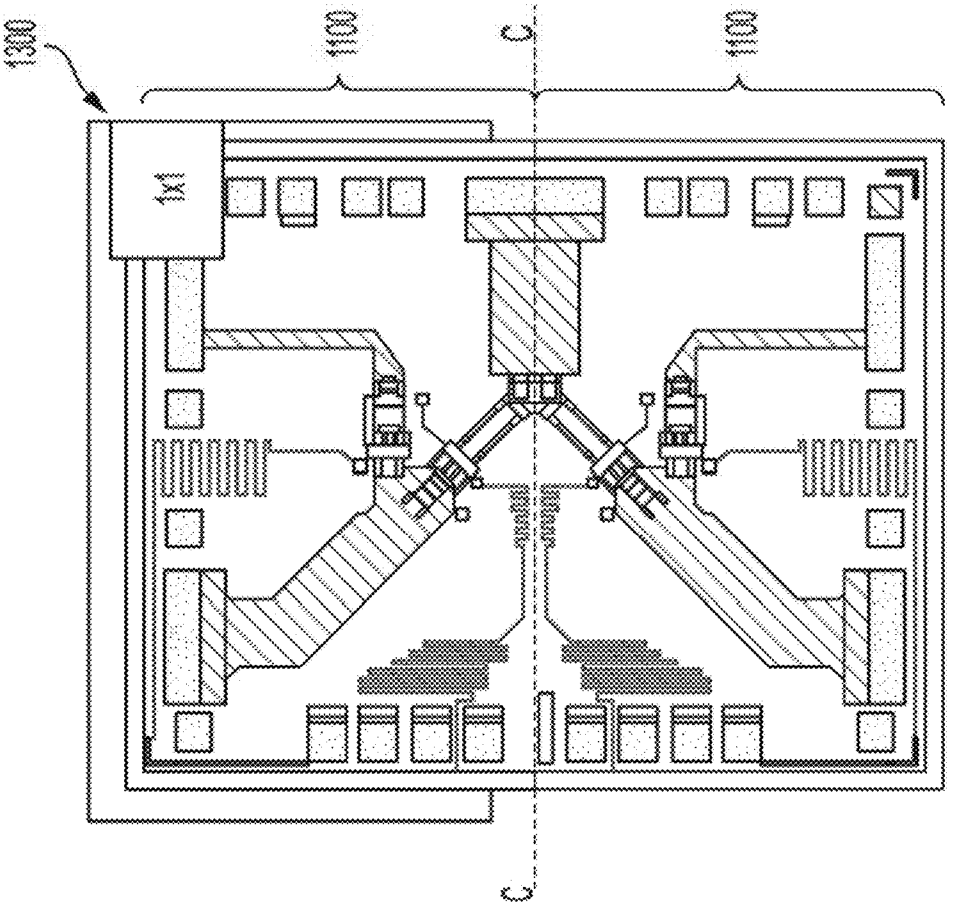
FIG. 13 is a schematic top view of an implementation of the MEMS switch configuration of FIG. 12, according to a non-limiting embodiment of the present application.

FIG. 13 is a schematic top view of an implementation of the MEMS switch configuration 1200 of FIG. 12. The MEMS switch configuration 1300 comprises two instances of the MEMS switch configuration 1100 of FIG. 11 arranged symmetrically about the line C-C.

The aspects described thus far can be used in combination. According to an aspect of the present application, a MEMS switch configuration comprises two electrically parallel sets of back-to-back MEMS switches, with an isolation stub coupled to a middle electrode of the back-to-back MEMS switches, and with a shunt MEMS switch of the types described previously. The combination of these three features may provide beneficial isolation performance, low insertion loss, and low signal reflection when the back-to-back MEMS switches are open.

Figure 14:
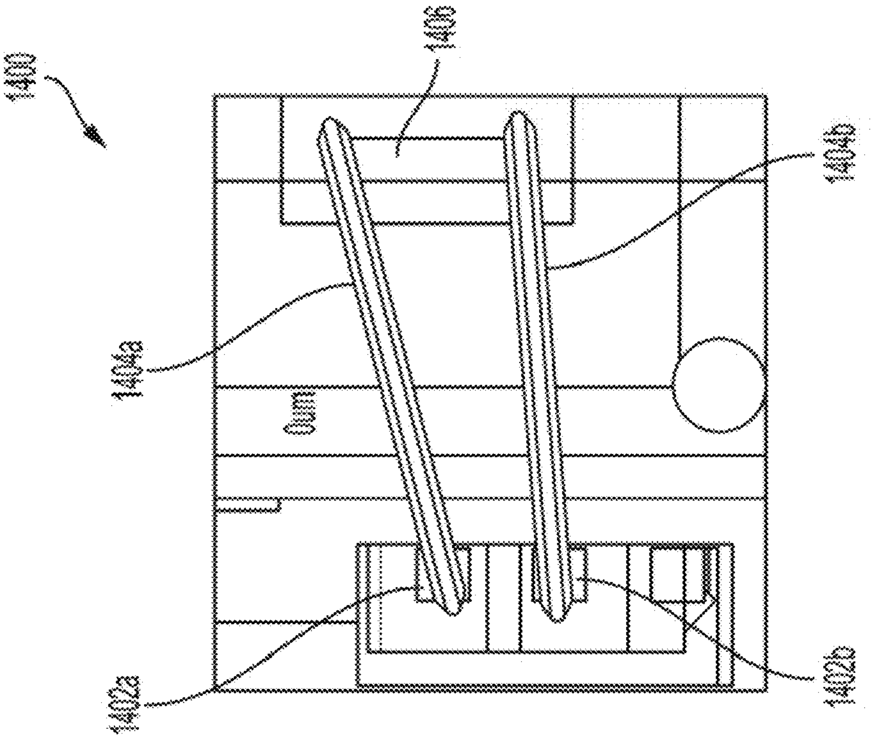
FIG. 14 is a top view of a split bond pad, according to a non-limiting embodiment of the present application.

According to an aspect of the present application, a MEMS switch die may include split bond pads. MEMS switch dies, such as those described herein, may include bond pads for bonding one or more bond wires. The bond wires may route signals to or from the MEMS switch die. For example, the MEMS switch die may be wire bonded to a controller die, a printed circuit board (PCB), or other substrate with which the MEMS switch die communicates. Utilizing split bond pads may facilitate placement of the bond wires. FIG. 14 illustrates a non-limiting example.

The bond pad configuration 1400 comprises a split bond having a first portion 1402*a* and a second portion 1402*b* disposed on a MEMS switch die. Bond wires 1404*a* and 1404*b* connected an electrode 1406 on a separate substrate to the portions 1402*a* and 1402*b*, respectively. The split nature of the portions 1402*a* and 1402*b* facilitates placement of the bond wires 1404*a* and 1404*b* during the bonding process. Additionally, the split nature reduces impedance discontinuities and reduces insertion loss. Reducing placement errors reduces variations in inductance. Split bond pads of the types described herein may be used in any of the previously described above. Although two bond wires are shown, more may be used. In some embodiments, four bond wires may be used. Still other numbers are possible. Also, the inductance can be tuned out with the addition of a suitable capacitance.

Figure 15:
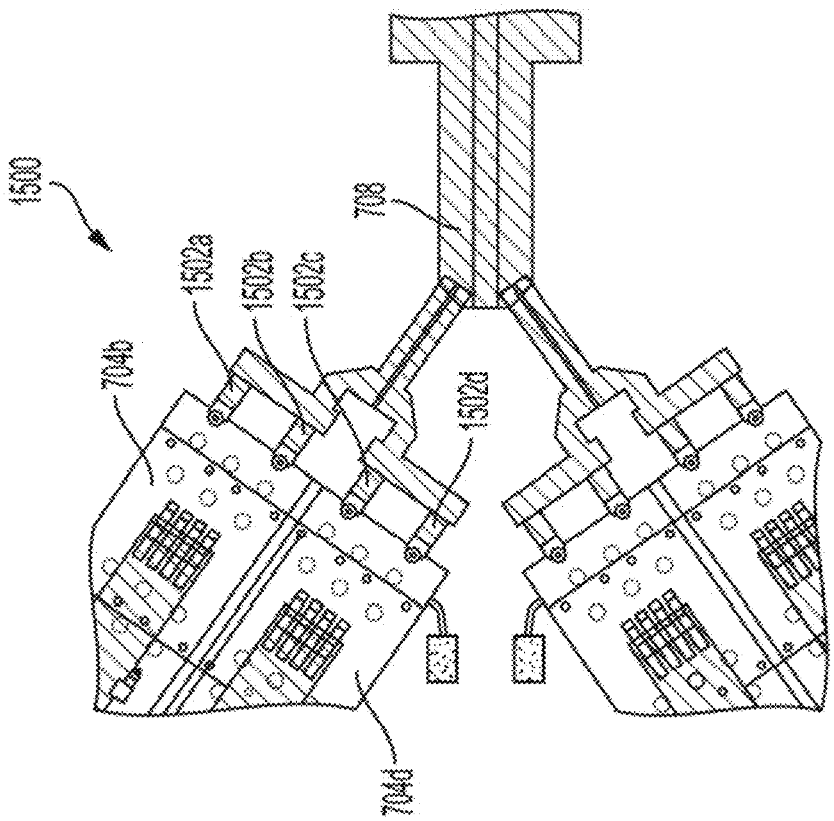
FIG. 15 is a top view of parallel interconnects configured to contact a MEMS switch, according to a non-limiting embodiment of the present application.

According to an aspect of the present application, interconnect metal connecting to the MEMS switches on a MEMS die is configured to provide a series impedance and inductance that is substantially matched for the parallel contacts to the MEMS switch. FIG. 15 illustrates a non-limiting example. FIG. 15 illustrates a portion of the MEMS switch configuration 700 of FIG. 7, focusing on the contacts of MEMS switches 704*b* and 704*d* to the electrode 708. Specifically, four electrically-parallel contacts are shown, as 1502*a*, 1502*b*, 1502*c*, and 1502*d*. Each of the four electrically parallel connections 1502*a*-1502*d* has a series resistance and inductance by the nature of the interconnect metal from which they are formed. Differences between the impedance and inductance of the parallel connections may produce undesirable signal behavior, such as reflections or signal mixing. Thus, the four parallel interconnections 1502*a*-1502*d* may be configured to have substantially equal values as each other for the combination of series impedance and inductance. Doing so may reduce insertion loss and provided enhanced performance by equally balancing power dissipation in the interconnects. In some embodiments, the combined serial impedance and inductance of the parallel interconnects may differ by no more than 10%, by no more than 5%, or by no more than any number between 2% and 10%, including any number within that range. In some embodiments, the current of the signal may naturally distribute to the outermost contacts. The inductance of those contacts may be increased to force current back to the center contacts, thus providing a more balanced split.

Figure 16:
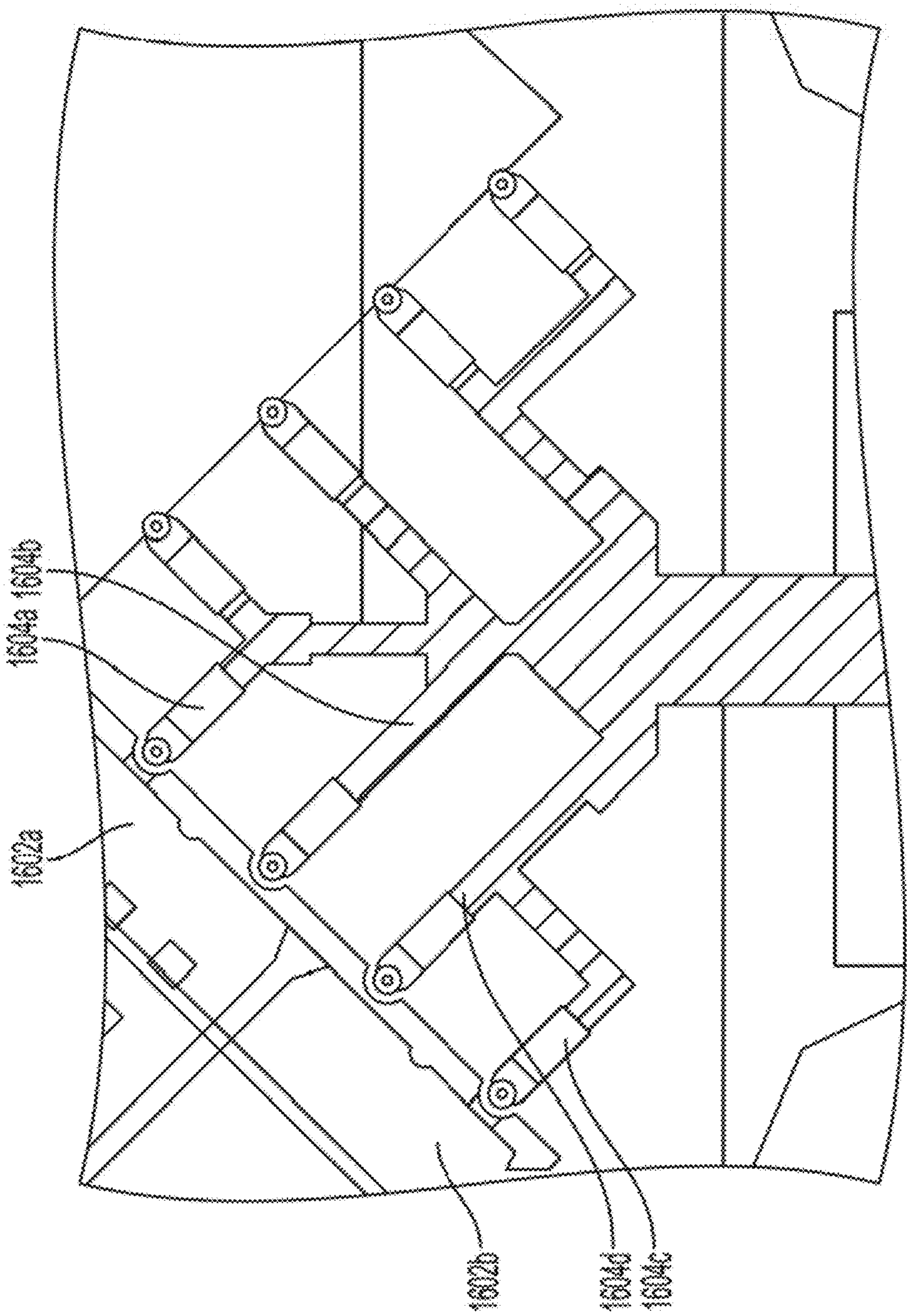
FIG. 16 is a top view of an alternative set of parallel interconnects configured to contact a MEMS switch, according to a non-limiting embodiment of the present application.

FIG. 16 illustrates an alternative configuration of electrically parallel interconnect metal traces according to a non-limiting embodiment of the present application. In this embodiment, two MEMS switches 1602*a* and 1602*b* are shown. MEMS switch 1602*a* connects to interconnects 1604*a* and 1604*b*. MEMS switch 1602*b* connects to interconnects 1604*c* and 1604*d*. Interconnects 1604*a* and 1604*b* may have substantially equal values of the combination of series impedance and inductance. Likewise, interconnects 1604*c* and 1604*d* may have substantially equal values of the combination of serial impedance and inductance. The shapes and dimensions of interconnections 1604*a*-1604*d* may be selected to provide the desired impedance and inductance values. At high signal frequency, the signal current will distribute to the extreme contacts. The illustrated configuration rebalances the current distribution more evenly between the contacts by adjusting the inductance of the branches.

Figure 17:
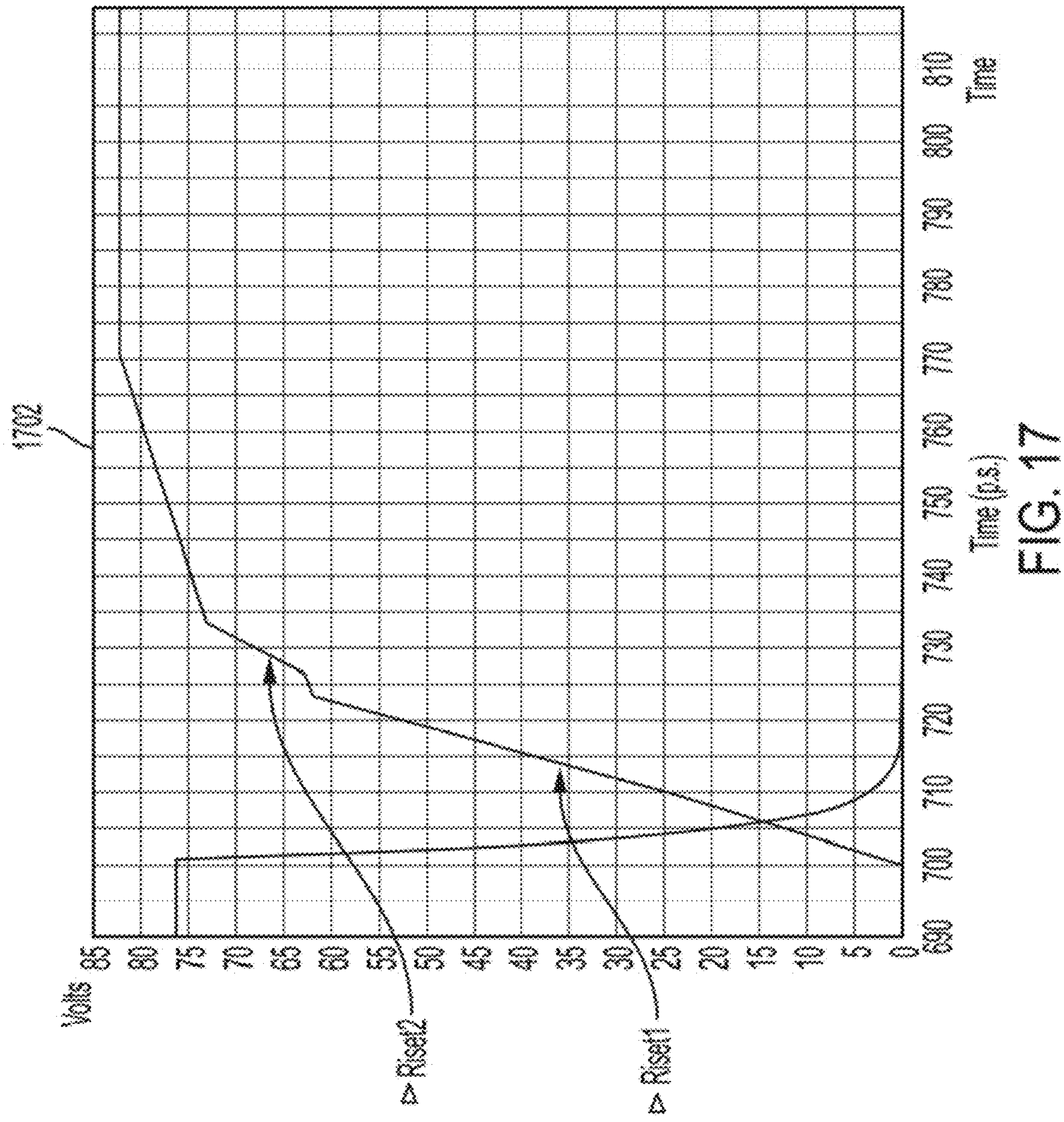
FIG. 17 is a graph illustrating a drive voltage as a function of time, for closing a MEMS switch, according to a non-limiting embodiment of the present application.

According to an aspect of the present application, the closing speed of a MEMS switch is controlled with a drive signal that has multiple slopes of voltage as a function of time. In some embodiments, it may be desirable to close a MEMS switch as quickly as possible. However, the faster the MEMS switch is moving when it closes, the greater the damage that can occur to the switch. Thus, aspects of the present application provide a gate voltage that rises quickly as a function of time initially, but which then rises more slowly as the beam of the MEMS switch gets closer to the contact electrode. FIG. 17 illustrates an example of a gate drive signal.

FIG. 17 is a graph illustrating a drive voltage as a function of time, for closing a MEMS switch, according to a non-limiting embodiment of the present application. For example, the voltage shown by line 1702 may represent the voltage applied to electrode 111 in FIG. 1. FIG. 17 shows that the drive signal may have two rates of rise, labeled as Riset1 and Riset2. Riset1 may have a greater slope than Riset2. Riset1 may be applied to start pulling the beam toward the contact electrode. Riset2 may be applied as the beam gets close to the contact electrode, thus decelerating the beam and reducing the force experienced when the beam makes contact with the contact electrode. The slopes of Riset1 and Riset2 may have any suitable values for closing the switch sufficiently quickly while reducing an impact on the beam when contact is made. For example, the slope of Riset1 may be approximately twice as great as the slope of Riset2. In some embodiments, the slope of Riset2 is between 40%-60% of the slope of Riset1. Other ratios are possible, however. The use of multiple slopes for closing a MEMS switch may be applied to a teeter-totter type switch or a cantilevered beam switch and may be applied to any of the types of MEMS switches described previously herein.

Figure 18:
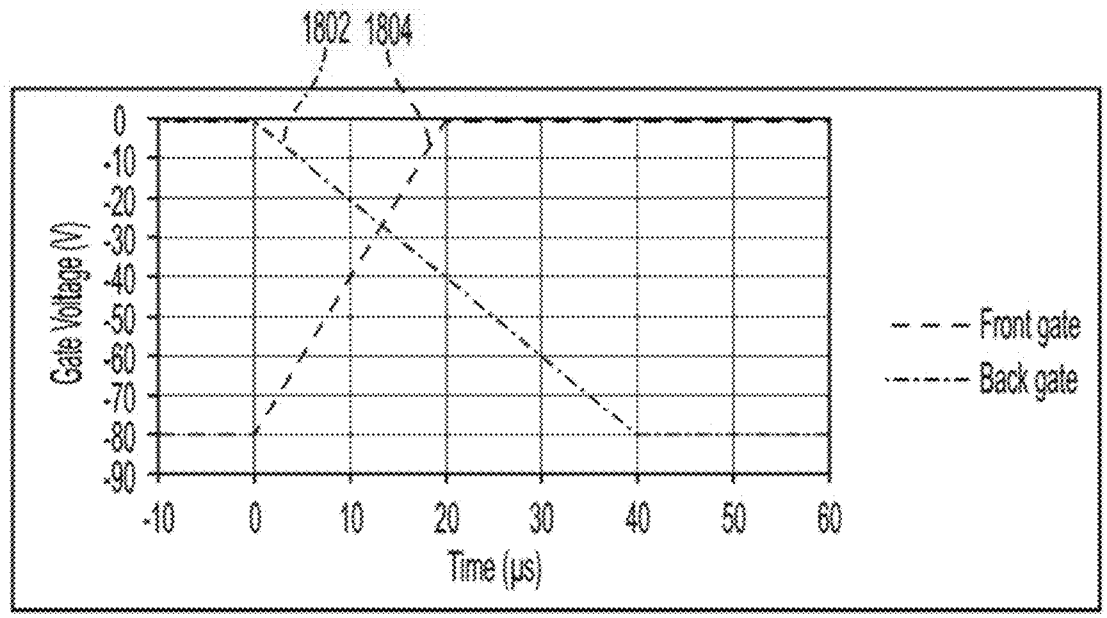
FIG. 18 is a graph showing the application of front and back gate drive voltages having different slopes, according to a non-limiting embodiment of the present application.
Figure 19:
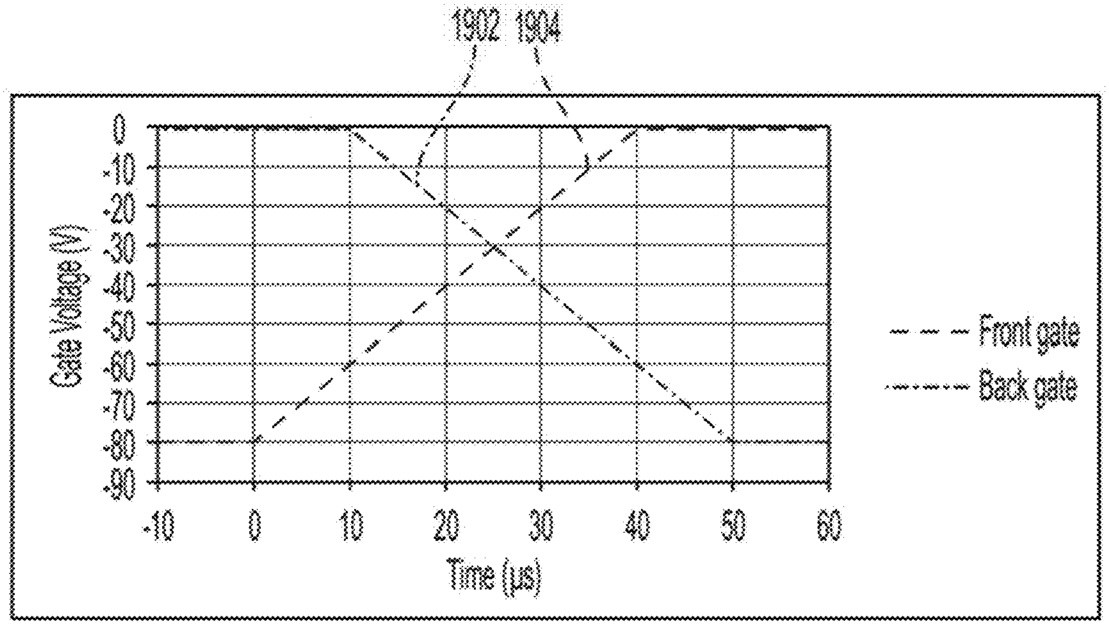
FIG. 19 is a graph showing the application of front and back gate drives staggered in time, according to a non-limiting embodiment of the present application.

According to an aspect of the present application, gate signals with different slopes may be applied to the front gate and back gate of a MEMS switch. FIGS. 18 and 19 illustrate examples.

FIG. 18 is a plot of a front gate voltage and back gate voltage, according to a non-limiting embodiment of the present application. For purposes of explanation, reference is also made to MEMS switch 104*a* of FIG. 1. Electrode 111 may be considered the front gate in this non-limiting example, and electrode 112 may be considered the back gate. Referring again to FIG. 18, the x-axis shows time in units of microseconds and the y-axis shows voltage in units of Volts. Line 1802 represents the back gate voltage and line 1804 represents the front gate voltage. As can be seen, the two voltages exhibit different slopes. Specifically, between 0 microseconds and 20 microseconds, the back gate voltage exhibits a slope with an absolute value that is twice that of the front gate voltage. Applying gate voltages with different slopes may provide a more controlled closing action of the switch, thus protecting the switch from damage.

FIG. 19 illustrates an alternative example. In this example, application of the front gate voltage is delayed relative to application of the back gate voltage. The front gate voltage is represented by line 1902 and the back gate voltage by line 1904. However, the two gate signals have the same slope. In some embodiments, the two signals do not overlap, or overlap only slightly. For example, the signals do not undergo a change in value at the same time.

Figure 20:
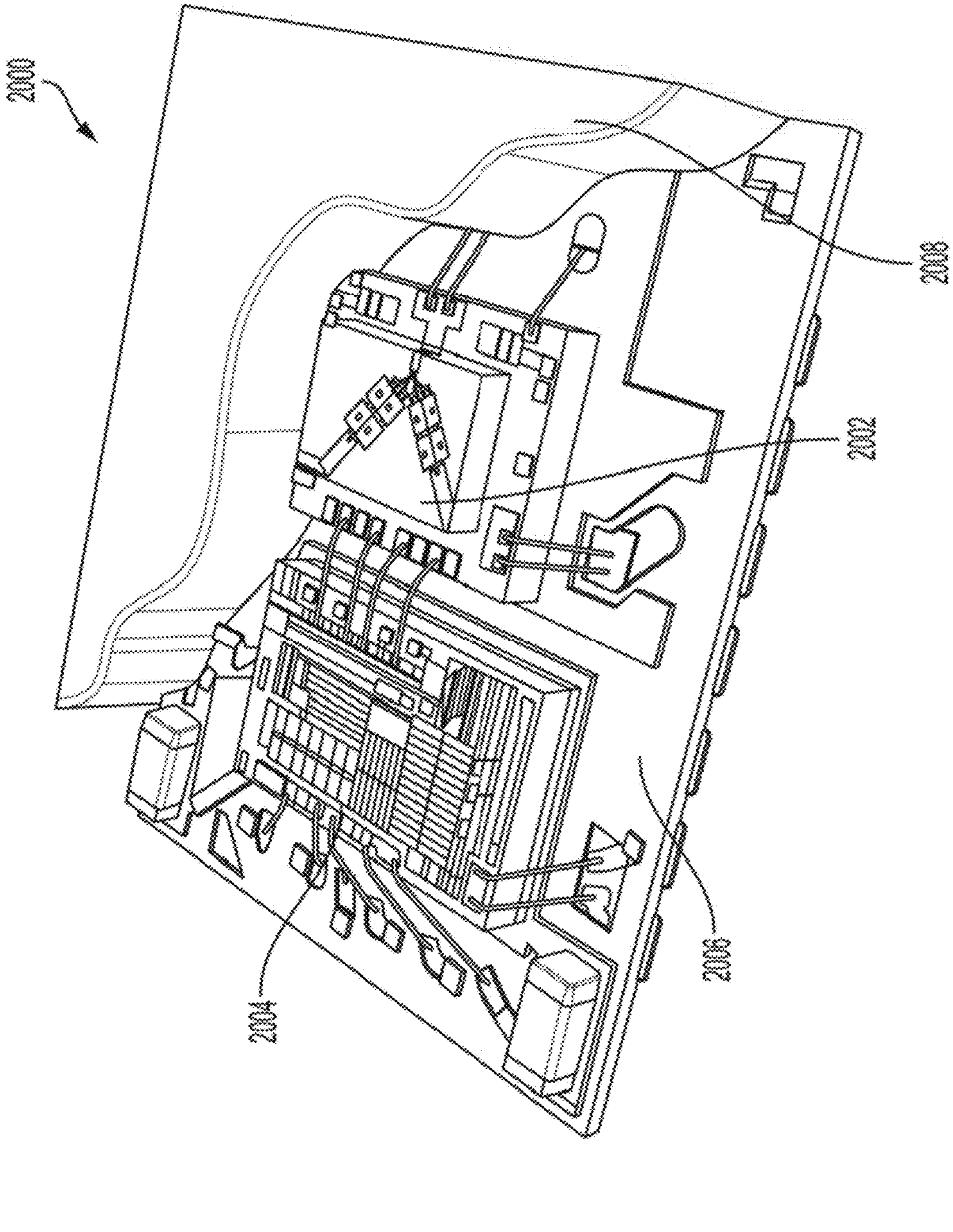
FIG. 20 illustrates a packaged MEMS switch device, according to a non-limiting embodiment of the present application.

According to an aspect of the present application, a MEMS switch die is coupled to a controller circuit and covered with an overmolded package. FIG. 20 illustrates a non-limiting example. The packaged MEMS switch device 2000 comprises a MEMS switch die 2002 and a control circuit die 2004. Both are positioned on a substrate 2006, such as a lead frame support or a laminate such as FR4. An overmolding 2008, shown in cutaway view in FIG. 20, covers the MEMS switch die 2002 and the control circuit die 2004. Other packaging configurations are also possible.

According to an aspect of the present application, circuits having multiple switchable paths coupling a common input to respective outputs include shunt switches arranged to reflect the energy passing through the open switch back to the common input terminal. For example, a shunt switch may couple an output electrode to a reference potential. Providing a shunt switch arranged in this manner enhances the isolation that an open switch is intended to provide, resulting in a reduction of the energy that would otherwise be lost in the path where the signal is supposed to be absent.

Figure 21:
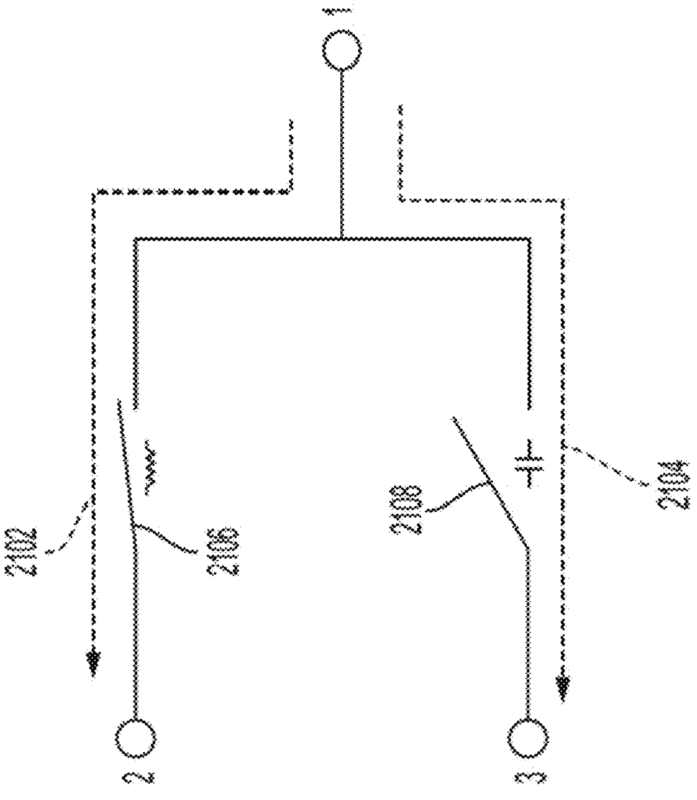
FIG. 21 is a circuit diagram of a MEMS switch device having two signal paths with switches that share one electrode but are connected to separate electrodes at another end of the signal paths.

FIG. 21 illustrates an example of a three-electrode MEMS switch device with a first signal path 2102 and a second signal path 2104. The MEMS switch device includes a first switch 2106 connected along the first signal path 2102 between the electrodes 1 and 2. The MEMS switch device includes a second switch 2108 connected along the second signal path 2108 between the electrodes 1 and 3. In some embodiments, electrode 1 is an input electrode and electrodes 2 and 3 are output electrodes. As such, a signal input at electrode 1 can be steered either towards electrode 2 or electrode 3 (but generally not both, except in some circumstances), depending on the needs of the user. In other embodiments, however, electrodes 2 and 3 may be input electrodes and electrode 1 may be an output electrode. As such, the MEMS switch device may steer towards electrode 1 either a signal input at electrode 2 or a signal input at electrode 3 (but generally not both, except in some circumstances), depending on the needs of the user. Switches 2102 and 2104 may be implemented using any suitable type of switchable device, including for example cantilevered MEMS switches, teeter-totter MEMS switches, transistors, or any suitable combination thereof. In some embodiments, a switch may be implemented using a back-to-back switch configuration of the types described above. In some of the embodiments in which either switch 2102 or switch 2104 (or both) is implemented using a back-to-back switch configuration, the midpoint may be coupled to the reference potential through an isolation stub (e.g., a resistor). Doing so may improve the isolation performance of the MEMS switches. For example, the isolation stub may be positioned as shown in FIG. 1—from the midpoint between MEMS switches 104*a* and 104*b* to the reference potential.

In some embodiments, the device of FIG. 21 may be operated so that the first switch 2106 is closed when the second switch 2108 is open, and vice versa. When a switch is closed, it effectively acts as a resistor, the resistance of which depends upon the type of switch being used. By contrast, when a switch is open it effectively acts as a capacitor, the capacitance of which also depends upon the type of switch being used. The example of FIG. 21 depicts a scenario in which switch 2106 is closed (thereby effectively acting as a resistor) and switch 2108 is open (thereby effectively acting as a capacitor). In this scenario, when a signal is transmitted along the first signal path 2102 from electrode 1 to electrode 2, although the signal is not intended to propagate to electrode 3, part of the signal power inadvertently couples across the switch 2108 due to the capacitive nature of the switch when it is open. This capacitive coupling degrades the isolation that the open switch is intended to provide, thereby resulting in loss of power.

According to an aspect of the present application, this problem can be obviated using shunt switches. For example, a three-electrode MEMS switch device may include a shorted connection switchably connected to the third electrode. When closed, a shunt switch coupling an output electrode to a reference potential may reflect any energy inadvertently transmitted across that path. FIGS. 22A-22E illustrate examples of three-electrode MEMS switch devices including short connections. It should be noted that the techniques described herein are not limited to three-electrode MEMS switch devices of the types illustrated in those figures. Such techniques may also be used in N-electrode MEMS switch devices, in which N signal paths couple a common input electrode to multiple output electrodes.

Figure 22A:
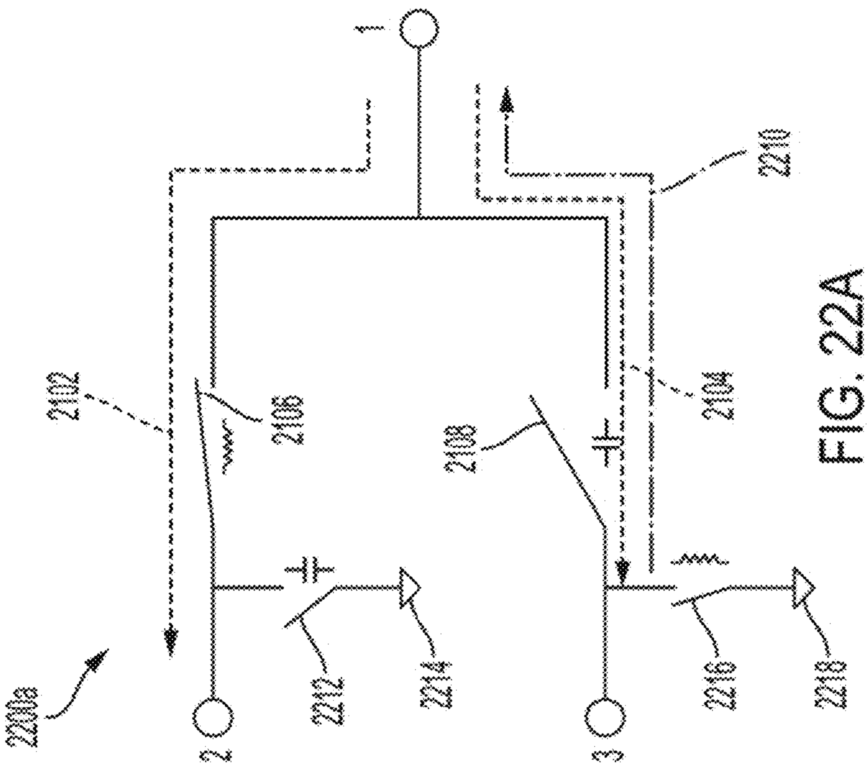
FIG. 22A is a circuit diagram of a MEMS switch device having two signal paths with switches that share one electrode but are connected to separate electrodes at another end of the signal paths and shunt switches connected between the separate electrodes and a reference potential, according to a non-limiting embodiment of the present application.

FIG. 22A illustrates an example of a three-electrode MEMS switch device 2200*a*. Similar to the example of FIG. 21, the three-electrode MEMS switch device 2200*a* includes a first signal path 2102 from electrode 1 to electrode 2 and a second signal path 2104 from electrode 1 to electrode 3. The three-electrode MEMS switch device 2200*a* includes the first switch 2106 connected along the first signal path 2102 between the electrodes 1 and 2 and the second switch 2108 connected along the second signal path 2108 between the electrodes 1 and 3. The first switch 2106 and the second switch 2108 may be any suitable MEMS switch, including but not limited to teeter-totter switches or cantilever switches.

Additionally, the three-electrode MEMS switch device 2200*a* further includes shunt switches 2212 and 2216 coupled to respective electrodes 2 and 3. The shunt switches 2212 and 2216 switchably couple electrodes 2 and 3 to reference potentials 2214 and 2218. The shunt switches 2212 and 2216 may be any suitable MEMS switch, including but not limited to teeter-totter MEMS switches, cantilever MEMS switches, transistors, or any suitable combination thereof. The shunt switches 2212 and 2216 may be coupled to the reference potentials 2214 and 2218 by, for example, a conductive pillar, a conductive bump, and/or a bond wire.

In some embodiments, the reference potentials 2214 and 2218 may comprise a ground potential such that when shunt switches 2212 and/or 2216 are closed, electrodes 2 and/or 3 are shorted to ground. In other embodiments, the reference potentials may comprise the fixed potentials of a voltage supply. As shown in the example of FIG. 22A, in some embodiments it may be desirable to close the shunt switch 2216 coupled to electrode 3 when the first switch 2106 is also closed, while the second switch 2108 and shunt switch 2212 remain open. In this manner, electrode 3 may be shorted to the reference voltage 2218 when the signal path 2102 is provided between electrodes 1 and 2. As a result of this arrangement of the various switches in three-electrode MEMS switch device 2200*a*, any signal which travels along the second signal path 2104 is reflected by the short created by the closed shunt switch 2216. This leads to a reflection signal 2210 carrying any energy (or at least some of the energy) transmitted towards electrode 3 back to electrode 1. Thus, electrode 3 is more strongly isolated from the signal traveling along the first signal path 2102 when the switches 2106, 2108, 2212, and 2216 are arranged as shown in the example of FIG. 22A. It should be appreciated that the switches 2106, 2108, 2212, and 2216 may be arranged in an opposing manner such that a signal may travel along second signal path 2104 while electrode 2 is isolated from electrodes 1 and 3.

The three-electrode MEMS switch device 2200*a* may be coupled to a controller (not shown in FIG. 22A) configured to control the states of switches 2106, 2108, 2212, and/or 2216. For example, the controller may be configured to cause a control voltage to be applied to a gate electrode associated with one or more of the switches 2106, 2108, 2212, and/or 2216 in order to cause one or more of the switches 2106, 2108, 2212, and/or 2216 to be closed or opened.

The controller may be configured to cause one or more of the switches 2106, 2108, 2212, and/or 2216 to close and/or open in a concomitant manner (e.g., within a same period of time, within a certain period of time after another switch closes or opens, one after another, and/or in response to a change of state of another switch in the three-electrode MEMS switch device 2200*a*). For example, the controller may be configured to form a first signal path between electrode 1 and electrode 2 by closing first switch 2106 and concomitantly closing the shunt switch 2216, thereby allowing a signal to travel along the first signal path 2102 and isolating terminal 3 from terminals 1 and 2. The controller may also be configured to open the second switch 2108 and/or to open the shunt switch 2212 concomitantly with the closing of the first switch 2106 and/or the shunt switch 2216.

FIGS. 22B-22E illustrate alternative examples of three-electrode MEMS switch devices 2200*b*-2200*e*. The three-electrode MEMS switch devices 2200*b*-2200*e* of FIGS. 22B-22E are the same in many respects as the three-electrode MEMS switch device 2200*a* of FIG. 22A. Thus, those components described previously in connection with FIG. 22A are not described again in detail here.

Figure 22C:
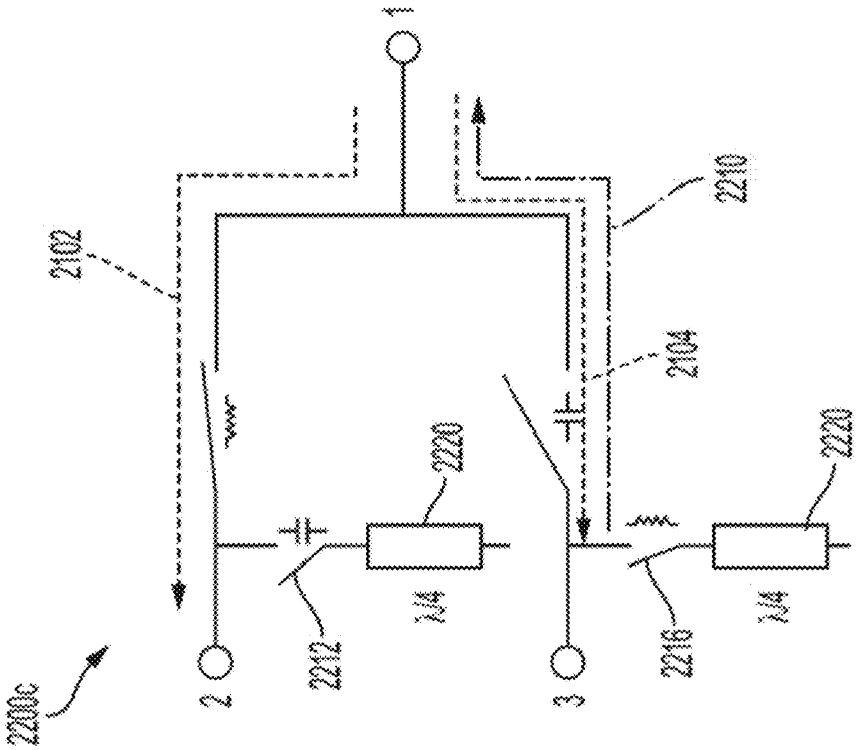
FIG. 22C is a circuit diagram of a MEMS switch device having two signal paths with switches that share one electrode but are connected to separate electrodes at another end of the signal paths and shunt switches connected between the separate electrodes and a quarter wave stub, according to a non-limiting embodiment of the present application.
Figure 22B:
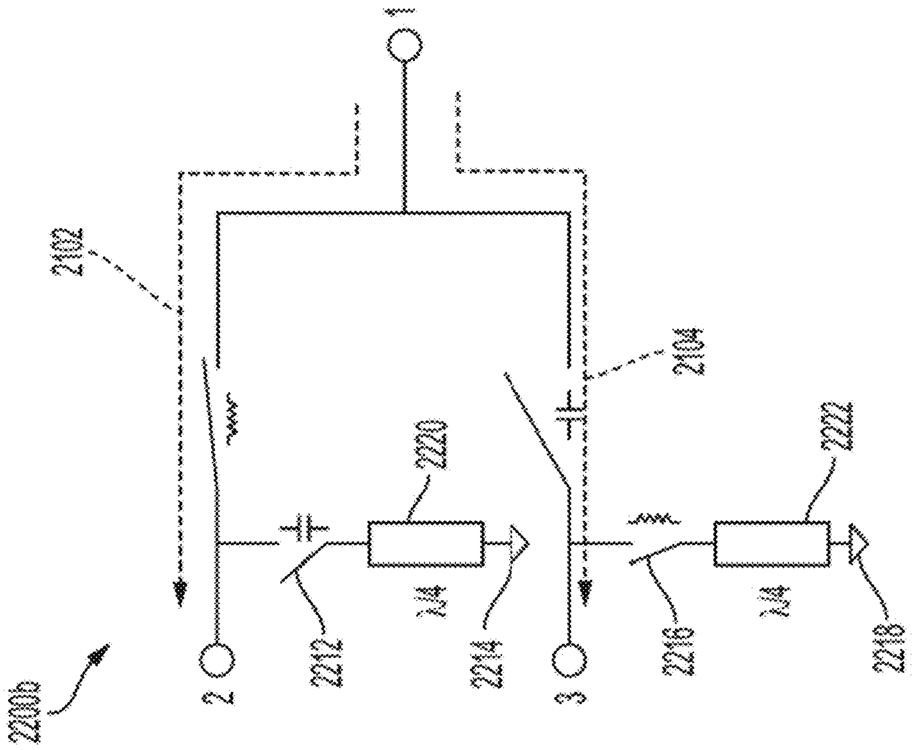
FIG. 22B is a circuit diagram of a MEMS switch device having two signal paths with switches that share one electrode but are connected to separate electrodes at another end of the signal paths and shunt switches connected between the separate electrodes and a quarter wave stub and a reference potential, according to a non-limiting embodiment of the present application.

FIG. 22B illustrates three-electrode MEMS switch device 2200*b*. In three-electrode MEMS switch device 2200*b*, the shunt switches 2212 and 2216 are coupled to the reference potentials by a bond wire. The inventors have appreciated that connections like bond wires exhibit a larger inductance and may act as resonators (e.g., quarter wave resonators), thereby causing the circuit to behave as an open circuit (at the resonant frequency) and do not reflect incident signals as desired. Accordingly, three-electrode MEMS switch device 2200*b* includes quarter wave (λ/4) stubs 2220 coupled between shunt switches 2212 and 2216 and reference potentials 2214 and 2218, respectively. The inclusion of quarter wave stubs 2220 counteracts the inductive effects of the bond wire, resulting in the desired signal reflection and isolation as described in connection with FIG. 22A.

FIG. 22C illustrates another example of a three-electrode MEMS switch device 2200*c* including quarter wave stubs 2220. In FIG. 22C, the quarter wave stubs 2220 are left floating rather than being connected to reference potentials as in the example of FIG. 22B. The floating quarter wave stubs 2220 also act as short circuits, thereby causing the reflection of reflected signal 2210.

Figure 22E:
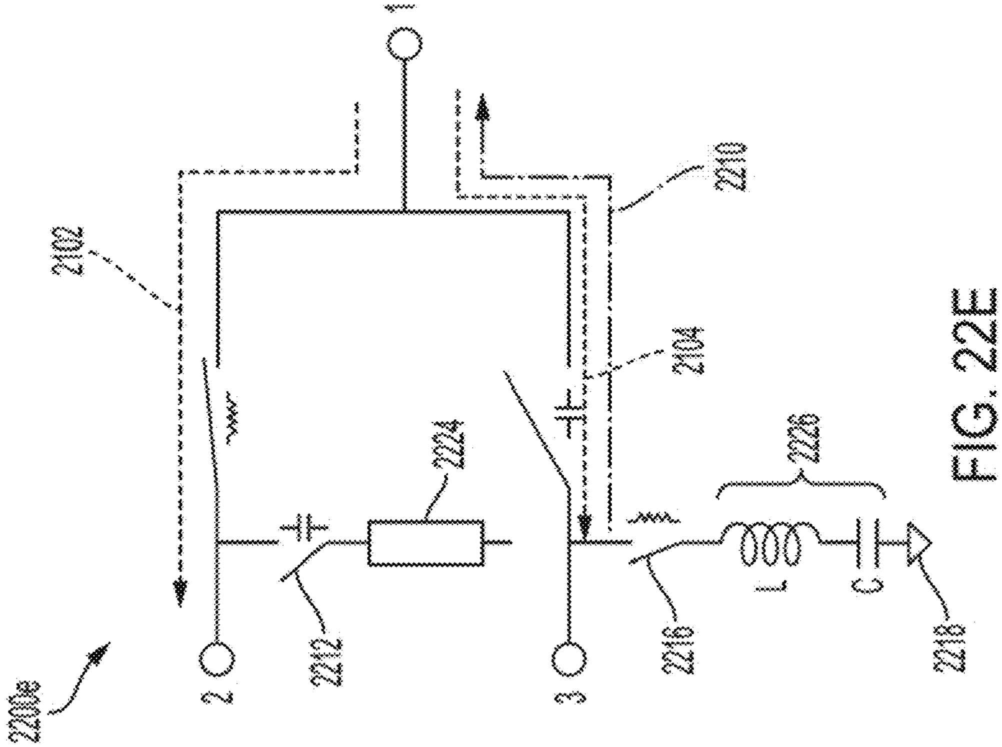
FIG. 22E is a circuit diagram of a MEMS switch device having two signal paths with switches that share one electrode but are connected to separate electrodes at another end of the signal paths and shunt switches connected between the separate electrodes, where one shunt switch is connected to an LC resonator stub and a reference potential, according to a non-limiting embodiment of the present application.
Figure 22D:
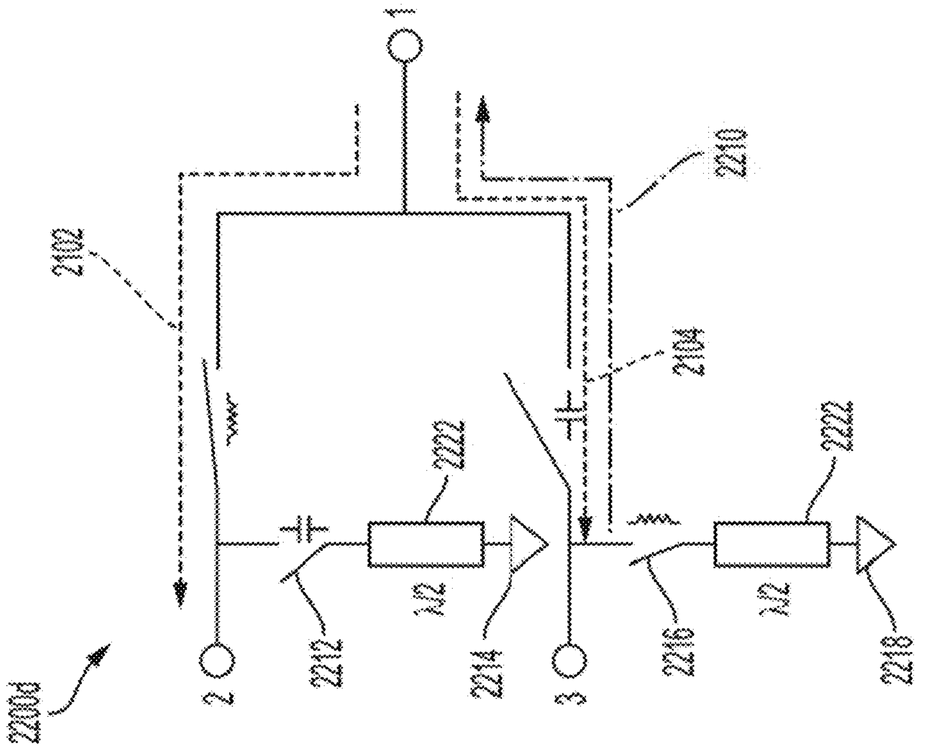
FIG. 22D is a circuit diagram of a MEMS switch device having two signal paths with switches that share one electrode but are connected to separate electrodes at another end of the signal paths and shunt switches connected between the separate electrodes and a half wave stub and a reference potential, according to a non-limiting embodiment of the present application.

FIG. 22D illustrates another example of a three-electrode MEMS switch device 2200*d*. Three-electrode MEMS switch device 2200*d* includes half wave stubs 2222 in the place of quarter wave stubs 2220 in the example of FIG. 22B. Half wave stubs 2222 may serve the same function as quarter wave stubs 2220, resulting in isolation of the desired electrode.

FIG. 22E illustrates another example of a three-electrode MEMS switch device 2200*e*. Three-electrode MEMS switch device 2200*e* includes stub 2224 connected to the shunt switch 2212 and LC circuit 2226 connected to the shunt switch 2216. The stub 2224 may be a quarter wave or half wave stub and may be left as an open stub, as shown in the example of FIG. 22E, or may alternatively be coupled to a reference potential, in some embodiments.

The shunt switch 2216 may be coupled to the reference potential 2218 by a bond wire having an inductance, as described in connection with FIG. 22B. The LC circuit 2226 includes an inductor and capacitor coupled between the shunt switch 2216 and the reference potential 2218. It should be appreciated that in some embodiments, the shunt switch 2216 may be coupled between the LC circuit 2226 and the reference potential 2218, as aspects of the present application are not limited in this manner.

When AC signals are transmitted through three-electrode MEMS switch device 2200, the LC circuit 2226 behaves as a short circuit, thereby causing reflected signal 2210 to reflect back towards electrode 1 and improving the isolation to electrode 3.

Figure 23A:
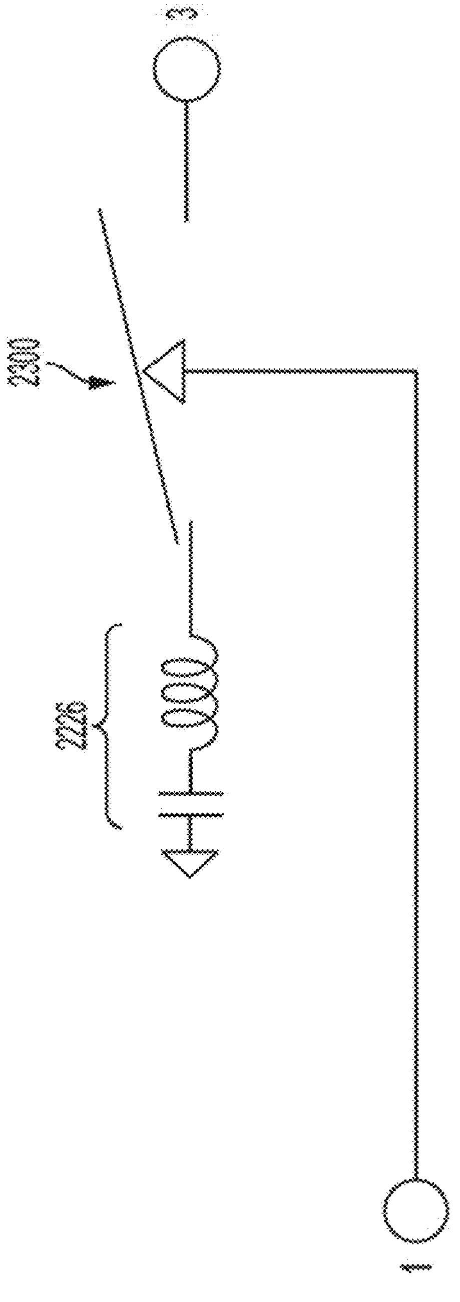
FIG. 23A is a circuit diagram of a MEMS switch device having a teeter-totter switch coupled between two electrodes, according to a non-limiting embodiment of the present application.
Figure 23B:
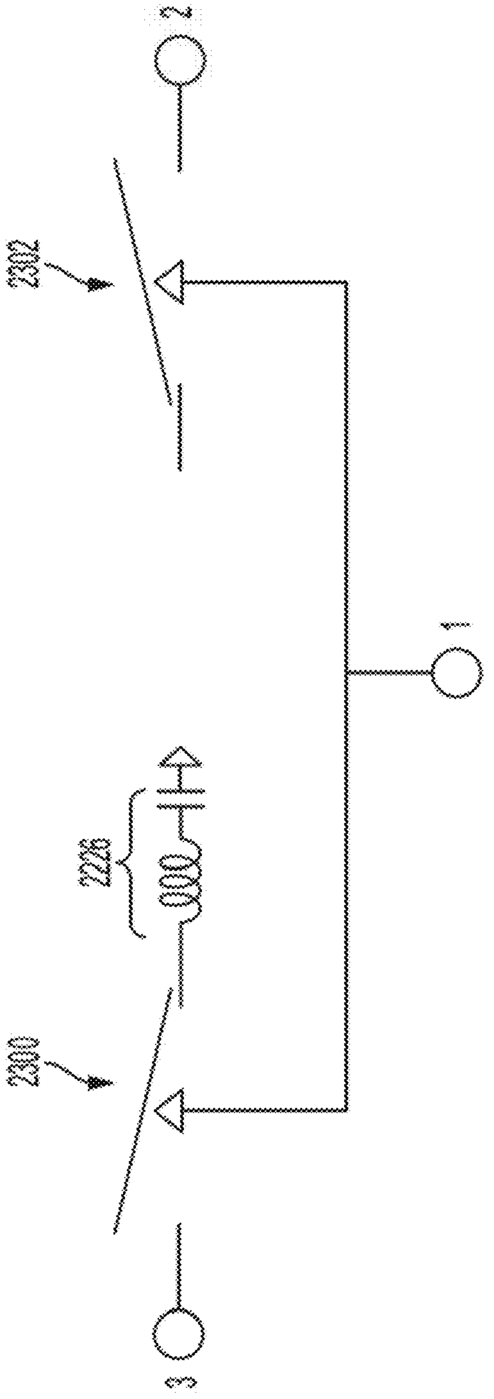
FIG. 23B is a circuit diagram of a MEMS switch device having two teeter-totter switches coupled between two electrodes, according to a non-limiting embodiment of the present application.

According to an aspect of the present application, one or more switches described herein may be implemented as a teeter-totter switch. As described in connection with FIG. 1, teeter-totter switches include a beam configured to pivot about an anchor such that the switch may be closed in one direction and open in another. The beam may be constructed to resist bending and may be more robust than other MEMS switch configurations. FIGS. 23A and 23B illustrate examples of implementations of a portion of three-electrode MEMS switch device 2200*e* using teeter-totter switches.

FIG. 23A illustrates a portion of a three-electrode MEMS switch device (e.g., three-electrode MEMS switch device 2200*e*) where second switch 2108 and shunt switch 2216 are implemented using (and therefore are part of) a common teeter-totter switch 2300. In this manner, a single switch can replace a pair of switches, as a teeter-totter switch, when open in one direction, is closed in another. For example, when the teeter-totter is in a first state, second switch 2208 is closed and shunt switch 2216 is open. Vice versa, when the teeter-totter is in a first state, second switch 2208 is open and shunt switch 2216 is closed. Such an implementation may reduce the mechanical complexity of a MEMS device.

FIG. 23B illustrates an alternative example of a three-electrode MEMS switch device (e.g., three-electrode MEMS switch device 2200*e*) implemented using teeter-totter switches. In the example of FIG. 23B, first switch 2212 and shunt switch 2106 of three-electrode MEMS switch device 2200*e* are implemented using the single teeter-totter switch 2302. The teeter-totter switch 2302 has its anchor electrically coupled to electrode 1 while its beam is switchably coupled between a floating shunt and electrode 2. The second switch 2108 and shunt switch 2216 of three-electrode MEMS switch device 2200*e* are implemented using the single teeter-totter switch 2300. Teeter-totter switch 2300 has its anchor also electrically coupled to electrode 1 while its beam is switchably coupled between an LC circuit 2226 coupled to a reference potential (e.g., ground) and terminal 3.

To operate the three-electrode MEMS switch device of FIG. 23B, a controller (not depicted) may be coupled to the three-electrode MEMS switch device. The controller may be configured to form a first signal path between electrode 1 and 2 by causing the beam of teeter-totter switch 2302 to move so that the beam is electrically coupled to electrode 2. The controller may also be configured, concomitantly with switching teeter-totter switch 2302, to switch teeter-totter switch 2300 so that the beam of teeter-totter switch 2300 is electrically coupled to LC circuit 2226.

Figure 24A:
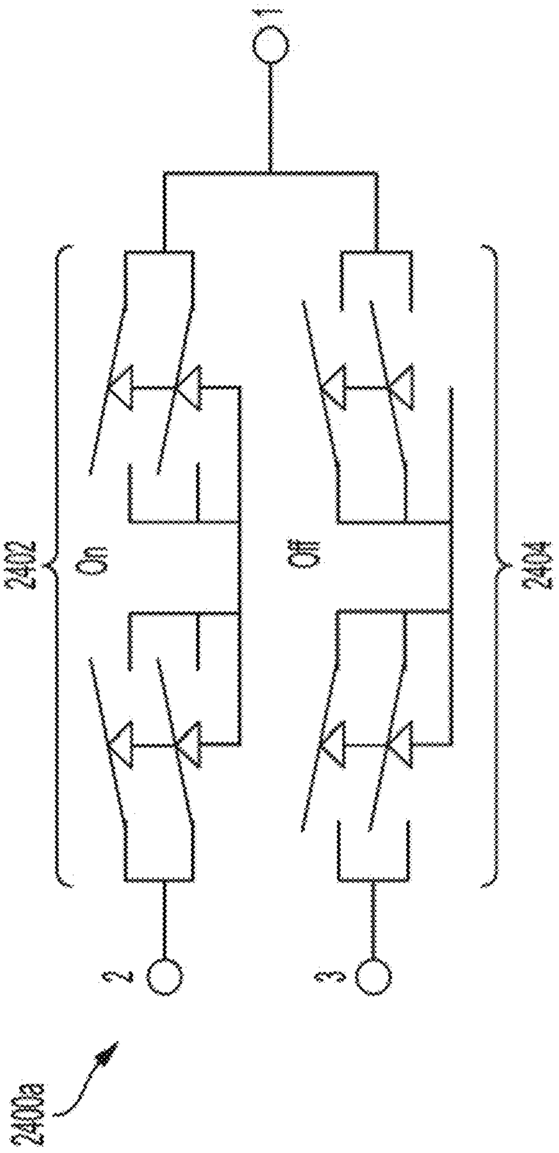
FIG. 24A is a circuit diagram of a MEMS switch device having two signal paths with two sets of four teeter-totter switches arranged to share one electrode but connected to separate electrical electrodes at another end of the signal paths, according to a non-limiting embodiment of the present application.
Figure 24B:
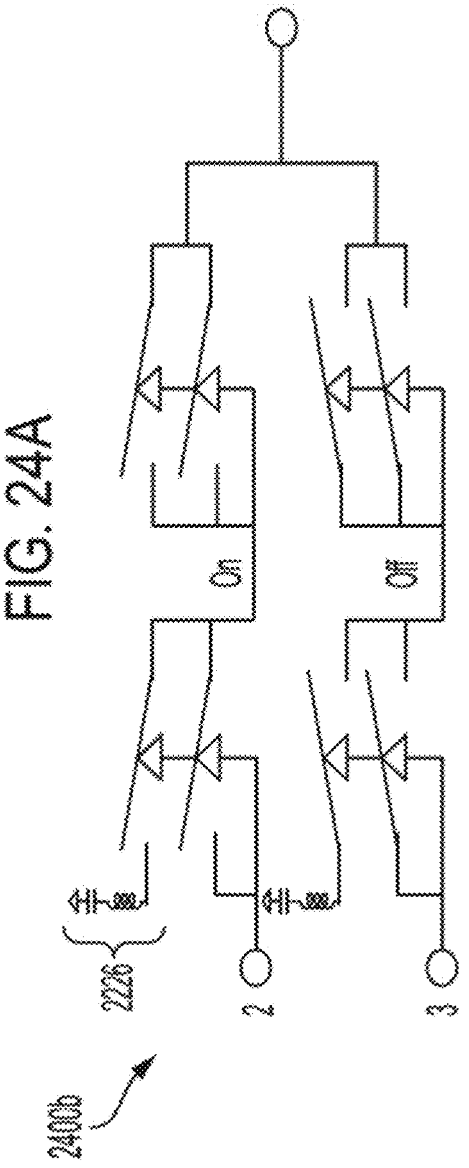
FIGS. 24B and 24C are circuit diagrams of MEMS switch devices having two signal paths with two sets of four teeter-totter switches arranged to share one electrode but connected to separate electrodes at another end of the signal paths, where certain teeter-totter switches are coupled to LC resonator stubs, according to a non-limiting embodiment of the present application.
Figure 24C:
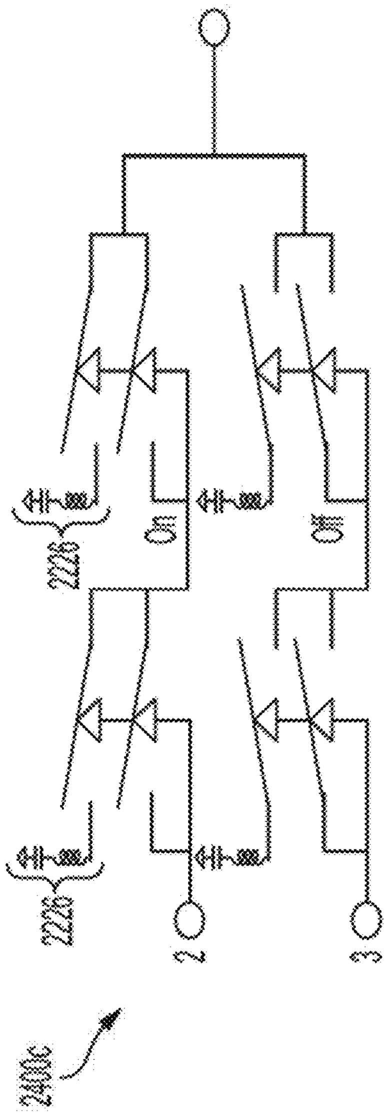

According to an aspect of the present application, a three-electrode MEMS switch device is implemented using sets of four teeter-totter switches disposed in each signal path. FIGS. 24A, 24B, and 24C illustrate examples of three-electrode MEMS switch devices having four teeter-totter switches arranged along each signal path.

FIG. 24A illustrates an example of a three-electrode MEMS switch device 2400*a*. Three-terminal MEMS switch device 2400*a* includes a first signal path 2402 between electrodes 1 and 2 and a second signal path 2404 between electrodes 1 and 3. Each signal path 2402 and 2404 includes a set of four teeter-totter switches having two teeter-totter switches switchably coupled to electrode 1 and two teeter-totter switches switchably coupled to either electrode 2 or 3. The anchors of all four teeter-totter switches are electrically coupled to one another.

As shown in the example of FIG. 24A, the four teeter-totter switches arranged along signal path 2402 are arranged in an "on" position that allows a signal to travel between terminals 1 and 2. In particular, the signal travels from electrode 1 to the beams of the right pair of teeter-totter switches and then travels between the anchors of the two pairs of teeter-totter switches and out to terminal 2 through the beams of the left pair of teeter-totter switches.

The four teeter-totter switches arranged along signal path 2404 are arranged in an "off" position that does not allow a signal to travel between electrode 1 and 3. In particular, the right pair of teeter-totter switches do not have their beams electrically coupled to electrode 1 and the left pair of teeter-totter switches do not have their beams electrically coupled to electrode 3, enabling isolation of electrode 3 from electrode 1.

FIGS. 24B and 24C illustrate additional examples of three-electrode MEMS switch devices 2400*b* and 2400*c*. Three-electrode MEMS switch device 2400*b* includes an LC circuit 2226, as described in connection with FIG. 22E, electrically coupled to one side of one teeter-totter switch of the four teeter-totter switches in each signal path 2402 and 2404. The four teeter-totter switches in the first signal path 2402 are arranged in an "on" position, with signal able to travel from electrode 1 to electrode 2. In particular, signal travels from electrode 1 to the beams of the right pair of teeter-totter switches, then travels from the anchors of the right pair of teeter-totter switches to the beams of the left pair of teeter-totter switches. The signal then travels from the anchors of the left pair of teeter-otter switches to electrode 2.

The four teeter-totter switches in the second signal path 2404 are arranged in an "off" position, with signal being unable to travel from electrode 1 to electrode 3. In this arrangement, a teeter-totter switch of the left pair of teeter-totter switches is in electrical contact with the LC circuit 2226. LC circuit 2226, as described in connection with FIG. 22E, is coupled to a reference potential by a bond wire. When an AC signal reaches LC circuit 2226, the LC circuit 2226 acts as a short circuit and reflects the received signal, thereby isolating terminal 3 from terminals 1 and 2.

Three-electrode MEMS switch device 2400*c* of FIG. 24C is similar in many respects to three-electrode MEMS switch device 2400*b* of FIG. 24B, but includes another LC circuit 2226 coupled to a teeter-totter switch of each of the right pairs of teeter-totter switches. The additional LC circuit 2226 serves to provide further isolation when the four teeter-totter switches are in the "off" position.

Figure 25:
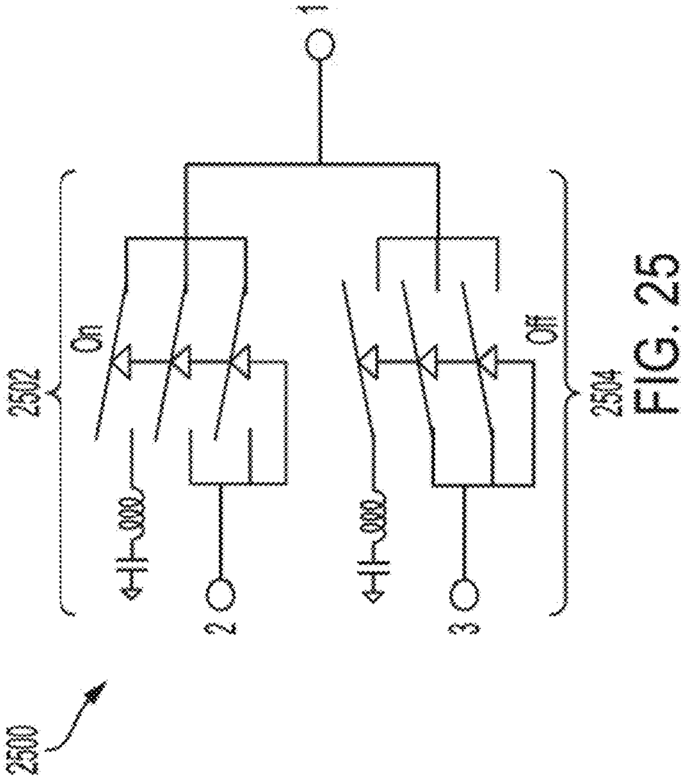
FIG. 25 is a circuit diagram of a MEMS switch device having two signal paths with three teeter-totter switches arranged in parallel to share one electrode but being connected to separate electrodes at another end of the signal paths, according to a non-limiting embodiment of the present application.

According to an aspect of the present application, a three-electrode MEMS switch device is implemented with three teeter-totter switches disposed in each signal path. Anchors of each teeter-totter switch within the three teeter-totter switches may be electrically connected to a respective electrode (e.g., electrode 2 or electrode 3). One end of the three teeter-totters' beams may be coupled in parallel to the shared electrode (e.g., electrode 1), while the other ends of the three teeter-totters' beams may be coupled to a respective electrode or to a short circuit. FIG. 25 illustrates an example of a three-electrode MEMS switch device having three teeter-totter switches arranged along each signal path.

FIG. 25 illustrates three-electrode MEMS switch device 2500. Three-electrode MEMS switch device 2500 includes a first signal path 2502 between electrodes 1 and 2 and a second signal path 2504 between electrodes 1 and 3. Each signal path 2502 and 2504 includes a set of three teeter-totter switches switchably coupled to, on one side, electrode 1 and, on the opposing side, to either (i) electrode 2 or 3 or to (ii) a short circuit. As shown in the example of FIG. 25, the short circuit may be an LC circuit (e.g., LC circuit 2226 as described in connection with FIG. 22E). The anchors of all three teeter-totter switches are electrically coupled to the respective electrode (e.g., electrode 2 or 3). In this manner, each signal path is provided with two switches enabling transmission of a signal across the signal path and increasing robustness of the three-electrode MEMS switch device.

Figure 26:
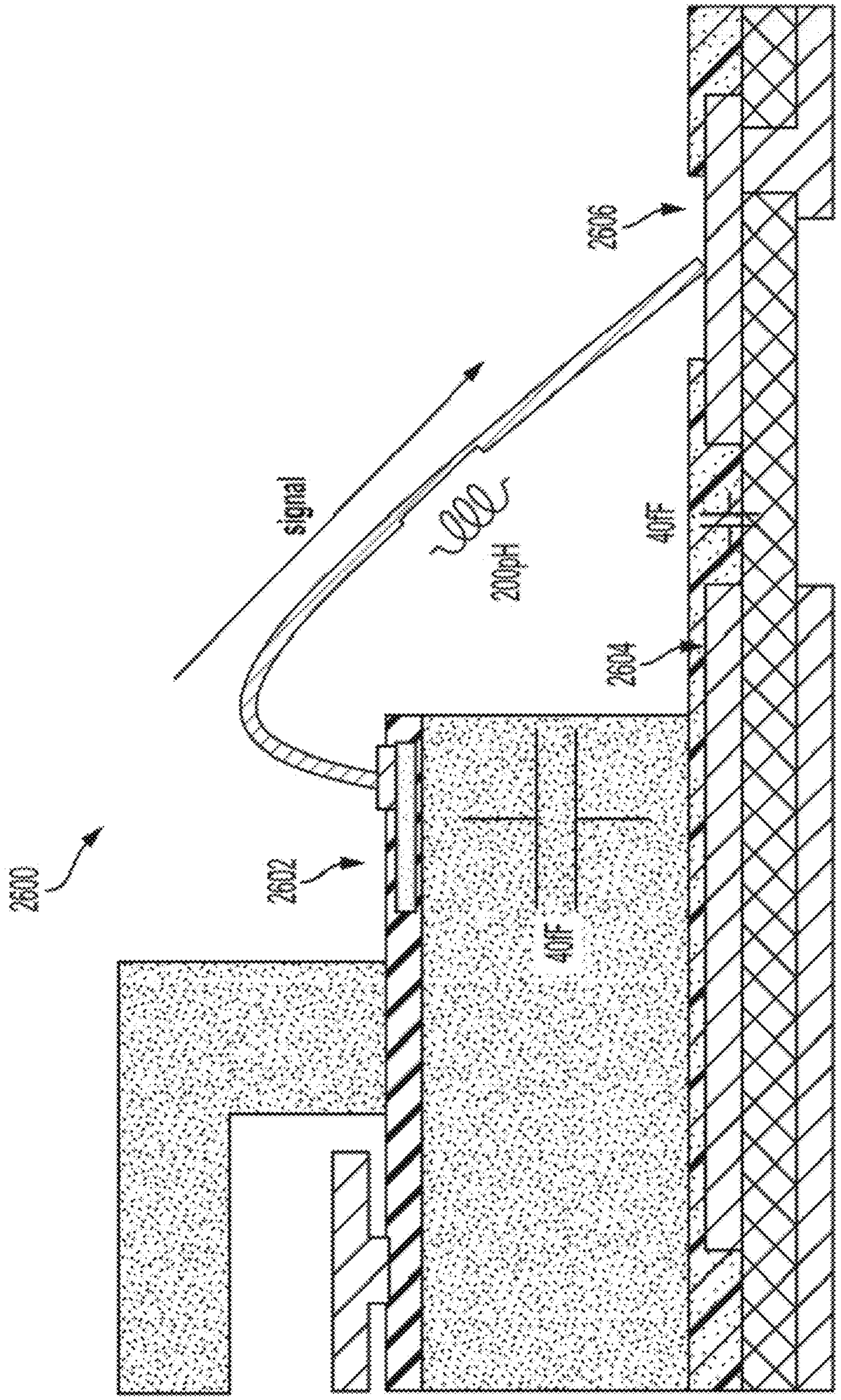
FIG. 26 is a schematic diagram of a package device including a MEMS switch device, according to a non-limiting embodiment of the present application.

As discussed above, some embodiments involve forming a shunt path that includes an LC resonator. Such embodiments require that a capacitor be formed in addition to the inductance produced by a wire bond. In some embodiments, a capacitor may be formed between a pair of electrodes along the vertical direction. FIG. 26 illustrates an example of such a vertical capacitor. The packaged MEMS switch device includes a bond wire 2600 electrically connecting a first conductive pad 2602 to a second conductive pad 2606. The bond wire 2600 may act as an inductor (e.g., having an inductance of approximately 200 pH). Placing capacitors (e.g., having a capacitance of approximately 40 fF, for example) between conductive pads within the package (e.g., between the first conductive pad 2602 and a third conductive pad 2604, or between the second conductive pad 2606 and the third conductive pad 2604) may create the capacitance necessary to form an LC resonator within the MEMS switch device. Pad 2602 lies on a first plane and pad 2604 lies on a second plane parallel to the first plane. This LC resonator may act as a short circuit (e.g., as described in connection with LC circuit 2226), thereby improving isolation of portions of the underlying MEMS switch device(s) within the package.

According to an embodiment of the present application, the front and back voltages may be staggered in time and may also exhibit different slopes. Any suitable combination of staggering in time and difference in slope sufficient to provide a desired closing behavior of the switch may be used.

According to an aspect of the present application, MEMS switch configurations of the types described herein may be fabricated on a variety of substrate types. In some embodiments, low resistivity silicon may serve as the substrate, for example the substrate of die 202 or any of the other dies described herein. Alternatively, the substrate may be formed of high resistivity silicon. As another example, the substrate may be formed of silicon-on-insulator (SOI).

The MEMS switches described herein may be used in various applications. For example, they may be used in high power applications, such as control circuits for industrial equipment. They may be used in medical equipment for high voltage switching. They may be used in wireless communications equipment such as mobile handsets and base station antennae. Other applications are also possible.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A microelectromechanical systems (MEMS) switch device, comprising:

a first signal path comprising a first MEMS switch and a second MEMS switch in a back-to-back configuration with the first MEMS switch; and a second signal path comprising a third MEMS switch and a fourth MEMS switch in a back-to-back configuration with the third MEMS switch, wherein the first signal path is electrically coupled between a first and second electrode and the second signal path is electrically coupled, separately from the first signal path, between the first electrode and the second electrode, and wherein the first MEMS switch is a first teeter-totter switch comprising a mid-beam anchor and a first gate electrode, the second MEMS switch is a second teeter-totter switch comprising a mid-beam anchor and a second gate electrode, and the first gate electrode is coupled to the second gate electrode.

2. The MEMS switch device of claim 1, further comprising:

a middle electrode electrically connected between the first MEMS switch and the second MEMS switch; and an isolation stub configured to connect the middle electrode to a reference potential.

3. The MEMS switch device of claim 1, further comprising:

a shunt switch coupling the first electrode to a reference potential.

4. The MEMS switch device of claim 1, further comprising:

a third signal path comprising a fifth MEMS switch and a sixth MEMS switch in a back-to-back configuration with the fifth MEMS switch; and a fourth signal path, separate from the third signal path, comprising a seventh MEMS switch and an eighth MEMS switch in a back-to-back configuration with the seventh MEMS switch, wherein the third signal path is electrically coupled between the first electrode and a third electrode and the fourth signal path is electrically coupled between the first electrode and the third electrode.

5. A microelectromechanical systems (MEMS) switch device, comprising:

first, second and third electrodes, wherein a first signal path is disposed between the first and second electrodes and a second signal path is disposed, separately from the first signal path, between the first and third electrodes;

a first MEMS switch electrically coupled between the first and second electrodes and forming a portion of the first signal path when the first MEMS switch is closed;

a second MEMS switch electrically coupled between the first and third electrodes and forming a portion of the second signal path when the second MEMS switch is closed; and a first shunt switch electrically coupled between the third electrode and a reference potential.

6. The MEMS switch device of claim 5, wherein the second MEMS switch and the first shunt switch are part of a teeter-totter switch having a mid-beam anchor, so that:

when the teeter-totter switch is in a first state, the second MEMS switch is closed and the first shunt switch is open, and when the teeter-totter switch is in a second state, the second MEMS switch is open and the first shunt switch is closed.

7. The MEMS switch device of claim 5, wherein the first shunt switch is electrically coupled to the reference potential by either a conductive pillar and/or a conductive bump.

8. The MEMS switch device of claim 5, wherein the first shunt switch is electrically coupled to the reference potential by a half wave stub.

9. The MEMS switch device of claim 5, wherein the first shunt switch is electrically coupled to the reference potential by a bond wire.

10. The MEMS switch device of claim 9, wherein the bond wire forms a quarter wave or half wave stub.

11. The MEMS switch device of claim 5, further comprising a controller configured to concomitantly close both the first MEMS switch and the first shunt switch.

12. The MEMS switch device of claim 11, wherein the controller is further configured to, concomitantly with closing the first MEMS switch, open the second MEMS switch.

13. The MEMS switch device of claim 12, further comprising a second shunt switch electrically coupled between the second electrode and the reference potential.

14. The MEMS switch device of claim 13, wherein the controller is further configured to, concomitantly with closing the first MEMS switch, open the second shunt switch.

15. A microelectromechanical systems (MEMS) switch device, comprising:

first, second and third electrodes, wherein a first signal path is disposed between the first and second electrodes and a second signal path is disposed between the first and third electrodes;

a first MEMS switch electrically coupled between the first and second electrodes and forming a portion of the first signal path when the first MEMS switch is closed;

a second MEMS switch electrically coupled between the first and third electrodes and forming a portion of the second signal path when the second MEMS switch is closed;

a first shunt switch electrically coupled between the third electrode and a reference potential; and an inductor/capacitor (LC) circuit coupled between the third electrode and the reference potential.

16. The MEMS switch device of claim 15, wherein the LC circuit comprises a vertical capacitor having first and second terminals, wherein the first terminal is formed on a pad that is connected to a wire bond and that lies on a first plane, and the second terminal lies on a second plane parallel to the first plane.

17. A method for operating a microelectromechanical systems (MEMS) switch device comprising a first MEMS switch coupling a first electrode to a second electrode, a second MEMS switch coupling the first electrode to a third electrode, and a first shunt switch coupling the third electrode to a reference potential, the method comprising:

forming a first signal path between the first electrode and the second electrode by closing the first MEMS switch, wherein the first MEMS switch is a first teeter-totter switch comprising a mid-beam anchor;

concomitantly with closing the first MEMS switch, forming a first shunt path between the third electrode and the reference potential by closing the first shunt switch; and concomitantly with closing the first MEMS switch, interrupting a second signal path between the first electrode and the third electrode by opening the second MEMS switch.

18. The method of claim 17, wherein the MEMS switch device further comprises a second shunt switch coupling the second electrode to the reference potential, and wherein the method further comprises:

concomitantly with closing the first MEMS switch, interrupting a second shunt path between the second electrode and the reference potential by opening the second shunt switch.

19. The method of claim 17, wherein the second MEMS switch and the first shunt switch are part of a common teeter-totter switch, and wherein:

opening the first shunt switch and closing the second MEMS switch collectively comprise switching the teeter-totter switch from a first state to a second state.

20. The method of claim 17, wherein opening the second MEMS switch includes wherein the second MEMS switch includes a teeter-totter switch comprising a mid-beam anchor.

* * * * *